United States Patent
Nishikawa et al.

(10) Patent No.: US 12,492,900 B2
(45) Date of Patent: Dec. 9, 2025

(54) MOUNTING STRUCTURE OF MICRO VIBRATOR

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Hideaki Nishikawa, Nisshin (JP); Yusuke Kawai, Nisshin (JP); Takahiko Yoshida, Nisshin (JP); Yuuki Inagaki, Nisshin (JP); Shota Harada, Nisshin (JP); Keitaro Ito, Nisshin (JP); Katsuaki Goto, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 253 days.

(21) Appl. No.: 18/189,322

(22) Filed: Mar. 24, 2023

(65) Prior Publication Data
US 2023/0324175 A1    Oct. 12, 2023

(30) Foreign Application Priority Data

Apr. 12, 2022  (JP) ................. 2022-065865

(51) Int. Cl.
*G01C 19/5691* (2012.01)
*B81B 3/00* (2006.01)

(52) U.S. Cl.
CPC ........ *G01C 19/5691* (2013.01); *B81B 3/0086* (2013.01); *B81B 2201/0242* (2013.01); *B81B 2203/04* (2013.01)

(58) Field of Classification Search
None
See application file for complete search history.

(56) References Cited

U.S. PATENT DOCUMENTS 6,474,161 B1 * 11/2002 Jeanroy .............. G01C 19/5691
                                                        73/504.13
10,119,820 B2 * 11/2018 Rozelle .............. G01C 19/5691
(Continued)

FOREIGN PATENT DOCUMENTS

CN        107036705 A      8/2017

OTHER PUBLICATIONS

Nishikawa et al., U.S. Appl. No. 19/095,990, filed Mar. 31, 2025 (as-filed specification and drawings).

*Primary Examiner* — Mark A Shabman
(74) *Attorney, Agent, or Firm* — Posz Law Group, PLC

(57) ABSTRACT

A mounting structure includes a micro vibrator and a mounting substrate. The micro vibrator includes a curved surface portion having an annular curved surface and a connecting portion extending from the curved surface portion toward an inner center position of the curved surface portion. The micro vibrator is disposed so that the connecting portion is bonded to the mounting substrate and the curved surface portion is in a hollow state free from other elements. The mounting substrate includes a plurality of electrode portions that are arranged to face and surround a rim of the curved surface portion of the micro vibrator, and spaced apart from each other, the rim being an end of the curved surface portion opposite to the connecting portion. Further, the mounting substrate includes a guard electrode.

13 Claims, 17 Drawing Sheets

(56) References Cited

U.S. PATENT DOCUMENTS

| | | | |
|---|---|---|---|
| 10,532,943 B2* | 1/2020 | Najafi | C03C 17/06 |
| 2010/0083758 A1* | 4/2010 | Vandebeuque | G01C 19/5691 |
| | | | 310/300 |
| 2012/0204641 A1* | 8/2012 | Vandebeuque | G01C 19/5691 |
| | | | 73/504.13 |
| 2016/0231113 A1* | 8/2016 | Rozelle | G01C 19/5691 |
| 2018/0188030 A1* | 7/2018 | Shang | G01C 19/5691 |
| 2019/0094024 A1* | 3/2019 | Najafi | G01C 19/5691 |
| 2022/0315411 A1* | 10/2022 | Ito | B81B 3/0021 |
| 2022/0316880 A1* | 10/2022 | Harada | G01C 19/5691 |

* cited by examiner

MOUNTING STRUCTURE OF MICRO VIBRATOR

CROSS REFERENCE TO RELATED APPLICATION

The present application claims the benefit of priority from Japanese Patent Application No. 2022-065865 filed on Apr. 12, 2022. The entire disclosures of the above application are incorporated herein by reference.

TECHNICAL FIELD

The present disclosure relates to a mounting structure of a micro vibrator having a three-dimensional curved shape.

BACKGROUND

In recent years, a system for automated driving of a vehicle has been developed. Such a system requires a technique of estimating its position with high accuracy. For example, a self-position estimation system equipped with a global navigation satellite system (GNSS) and an internal measurement unit (IMU) has been developed for so-called level 3 automated driving. The IMU is, for example, a six-axis inertial sensor composed of a three-axis gyro sensor and a three-axis acceleration sensor. In the feature, in order to realize a level 4 or higher automated driving, an IMU with higher sensitivity than the current system is required.

For realizing such a highly sensitive IMU, a bird-bath resonator gyroscope (BRG) is considered to be a promising gyro sensor. The BRG has a mounting substrate and a micro vibrator mounted on the mounting substrate. The micro vibrator has substantially a hemispherical three-dimensional curved surface and vibrates in a wine-glass mode. This micro vibrator has a Q factor, which represents a vibration state, of $10^6$ or more. Therefore, this micro vibrator is expected to achieve a higher sensitivity than a previous micro vibrator.

SUMMARY

The present disclosure describes a mounting structure including a micro vibrator and a mounting substrate. The micro vibrator includes a curved surface portion having an annular curved surface and a connecting portion extending from the curved surface portion toward an inner center position of the curved surface portion. The micro vibrator is disposed so that the connecting portion is bonded to the mounting substrate and the curved surface portion is in a hollow state free from other elements. The mounting substrate includes a plurality of electrode portions that are arranged to face and surround a rim of the curved surface portion of the micro vibrator, and spaced apart from each other, the rim being an end of the curved surface portion opposite to the connecting portion. Further, the mounting substrate includes a guard electrode.

BRIEF DESCRIPTION OF THE DRAWINGS

Objects, features, and advantages of the present disclosure will become more apparent from the following detailed description made with reference to the accompanying drawings, in which like parts are designated by like reference numbers and in which.

DETAILED DESCRIPTION

Figure 1:
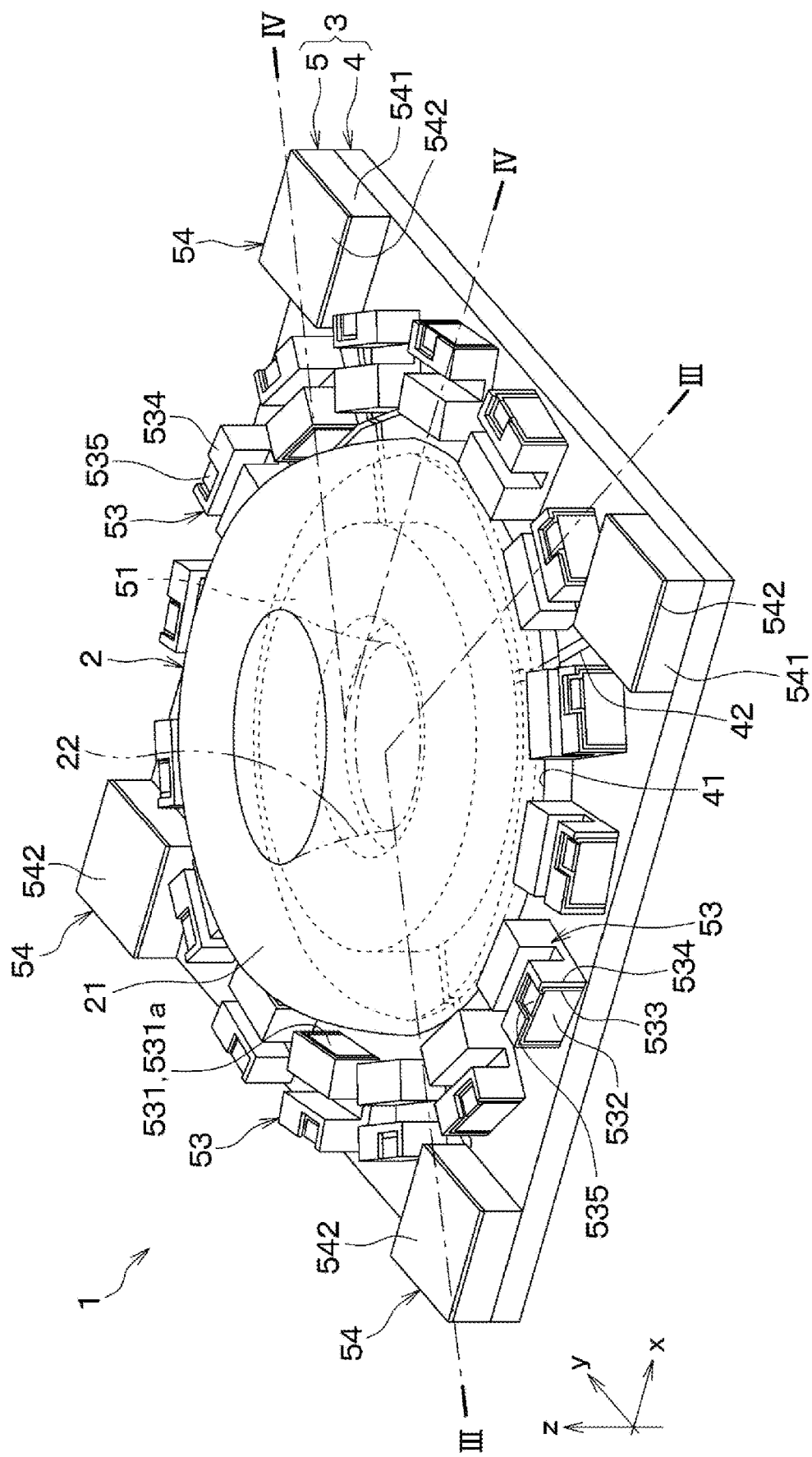
FIG. 1 is a diagram showing a perspective view of an inertial sensor according to a first embodiment.

To begin with, a relevant technology will be described only for understanding the embodiments of the present disclosure.

As an example of a micro vibrator for achieving a higher sensitivity, there is a mounting structure having a micro vibrator and a mounting substrate on which the micro vibrator is mounted. The micro vibrator has substantially a hemispherical three-dimensional curved surface and a cylindrical bonding portion extending from the vicinity of the top of the hemispherical three-dimensional shape toward the center of the hemispherical shape. The bonding portion is inserted into a bonding area of the mounting substrate surrounded by a substantially annular frame. In this mounting structure, a surface electrode covering the entire surface of the micro vibrator and a wiring formed in the bonding area of the mounting substrate are bonded to each other, so that a predetermined voltage can be applied to the surface electrode of the micro vibrator via the wiring of the mounting substrate.

In a bird-bath resonator gyroscope (BRG), for example, the micro vibrator is bonded to a bonding area electrically connected to a wiring on the mounting substrate. The BRG vibrates the micro vibrator by applying a voltage to the surface electrode of the micro vibrator via the wiring formed on the mounting substrate, and detects an electrostatic capacitance between the surface electrode of the micro vibrator and an electrode portion of the mounting substrate facing the surface electrode. However, according to the intensive study of the inventors of the present disclosure, there is a fear that a surface of the electrode portion on the mounting substrate other than the surface facing the micro vibrator causes an electrical influence onto a side surface of the micro vibrator, superimposing, as noise, on the electrostatic capacitance to be detected.

The present disclosure provides a mounting structure of a micro vibrator that has a three-dimensional curved surface and a surface electrode covering the three-dimensional curved surface, and is bonded on a mounting substrate, and the mounting structure is capable of reducing noise caused by a surface of an electrode portion on the mounting substrate other than a surface facing the electrode portion.

According to a first aspect of the present disclosure, a mounting structure includes a micro vibrator and a mounting substrate. The micro vibrator includes a curved surface portion having an annular curved surface and a connecting portion extending from the curved surface portion toward an inner center position of the curved surface portion. The mounting substrate includes a plurality of electrode portions that are arranged to face and surround a rim of the curved surface portion of the micro vibrator, and spaced apart from each other, the rim being an end of the curved surface portion opposite to the connecting portion. The micro vibrator is disposed so that the connecting portion is bonded to the mounting substrate and the curved surface portion is in a hollow state free from other elements. The plurality of electrode portions each include: a base portion having a facing surface facing the rim and an upper surface different from the facing surface and opposite to the mounting substrate; an insulating film covering at least the upper surface of the base portion; and a guard electrode covering at least the upper surface of the base portion above the insulating film and being electrically independent of the base portion.

The mounting structure according to the first aspect includes the micro vibrator having the three-dimensional curved surface, and the plurality of electrode portions disposed on the mounting substrate to surround the rim of the micro vibrator and spaced apart from each other. Further, the plurality of electrode portions is partly covered with a guard electrode that is electrically independent from the electrode portion. The guard electrode covers at least the upper surface of the electrode portion, which is a surface opposite to the mounting substrate and different from the facing surface facing the rim of the micro vibrator. As a result, when a voltage is applied to the electrode portion, the guard electrode shields the lines of electric force directed from the upper surface of the electrode portion toward the micro vibrator, and suppresses the electrical influence onto the micro vibrator caused by the upper surface. Accordingly, the mounting structure reduces noise caused by the surfaces of the electrode portion other than the surface facing the micro vibrator.

According to a second aspect of the present disclosure, a mounting structure includes a micro vibrator and a mounting substrate. The micro vibrator includes a curved surface portion having an annular curved surface and a connecting portion extending from the curved surface portion toward an inner center position of the curved surface portion. The mounting substrate includes a plurality of electrode portions that are arranged to face and surround a rim of the curved surface portion of the micro vibrator, and are spaced apart from each other, the rim being an end of the curved surface portion opposite to the connecting portion. The micro vibrator is disposed so that the connecting portion is bonded to the mounting substrate and the curved surface portion is in a hollow state free from other elements. The plurality of guard electrodes and the plurality of electrode portions are arranged such that at least one guard electrode is located between adjacent electrode portions.

The mounting structure according to the second aspect includes the micro vibrator having the three-dimensional curved surface, and the plurality of electrode portions and the plurality of guard electrodes arranged on the mounting substrate to surround the rim of the micro vibrator while being spaced apart from each other. At least one guard electrode is arranged between adjacent electrode portions. Since at least one guard electrode is disposed between the adjacent electrode portions, the area of the upper surface of the electrode portion opposite from the mounting substrate and different from the facing surface facing the rim of the micro vibrator can be made smaller than that in a configuration without having the guard electrode. As a result, when a voltage is applied to the electrode portion, the lines of electric force directed from the upper surface toward the micro vibrator are reduced by the reduction in the area of the upper surface, thereby reducing the electrical influence. Accordingly, the mounting structure reduces the noise caused by the surfaces of the electrode portion other than the surface facing the micro vibrator.

Hereinafter, embodiments of the present disclosure will be described with reference to the drawings. In the following embodiments, the same or equivalent parts are denoted by the same reference numerals.

First Embodiment

A mounting structure 1 of a first embodiment will be described with reference to the drawings. The mounting structure 1 of the present embodiment has a micro vibrator 2 that vibrates in a wine glass mode, and is suitably applied to various devices using the vibration characteristics of the micro vibrator 2, for example, inertial sensors of gyro sensors such as BRGs. In this specification, a configuration in which the mounting structure 1 is applied to a BRG will be described as a representative example. However, the application of the mounting structure 1 is not limited to the BRG.

In FIG. 1, in order to make it easier to understand the configurations of the micro vibrator 2 and a mounting substrate 3, which will be described later, portions of outlines of the micro vibrator 2 and the mounting substrate 3 that are hidden from the angle shown in FIGS or 2 are indicated by dashed dotted lines.

Hereinafter, for the convenience of explanation, as shown in FIG. 1, a direction along a plane of the mounting substrate 3 and along one side of the outline of the mounting substrate 3 is referred to as an "x direction", and a direction orthogonal to the x direction and along the plane of the mounting substrate 3 is referred to as a "y direction". A direction normal to an xy plane including the x direction and the y direction is referred to as a "z direction." The x, y, and z directions in views of FIG. 2 and subsequent figures correspond to the x, y, and z directions in FIG. 1, respectively. Further, in this specification, "upper" or "upward" represents a direction along the z direction in the view and represents a direction along the arrow, and "lower" or "downward" represents the opposite direction to the upper or upward. Furthermore, in this specification, a state in which the mounting structure 1 or the mounting substrate 3 is viewed from the top along the z direction is referred to as a "top view".

A mounting structure 1 of the present embodiment includes a micro vibrator 2 and a mounting substrate 3, for example, as shown in FIG. 1. A part of the micro vibrator 2 is bonded to the mounting substrate 3. The mounting structure 1 detects an angular velocity applied thereto based on a change in capacitance between a thin micro vibrator 2, which vibrates in a wineglass mode, and multiple electrode portions 53 on the mounting substrate 3.

Figure 2:
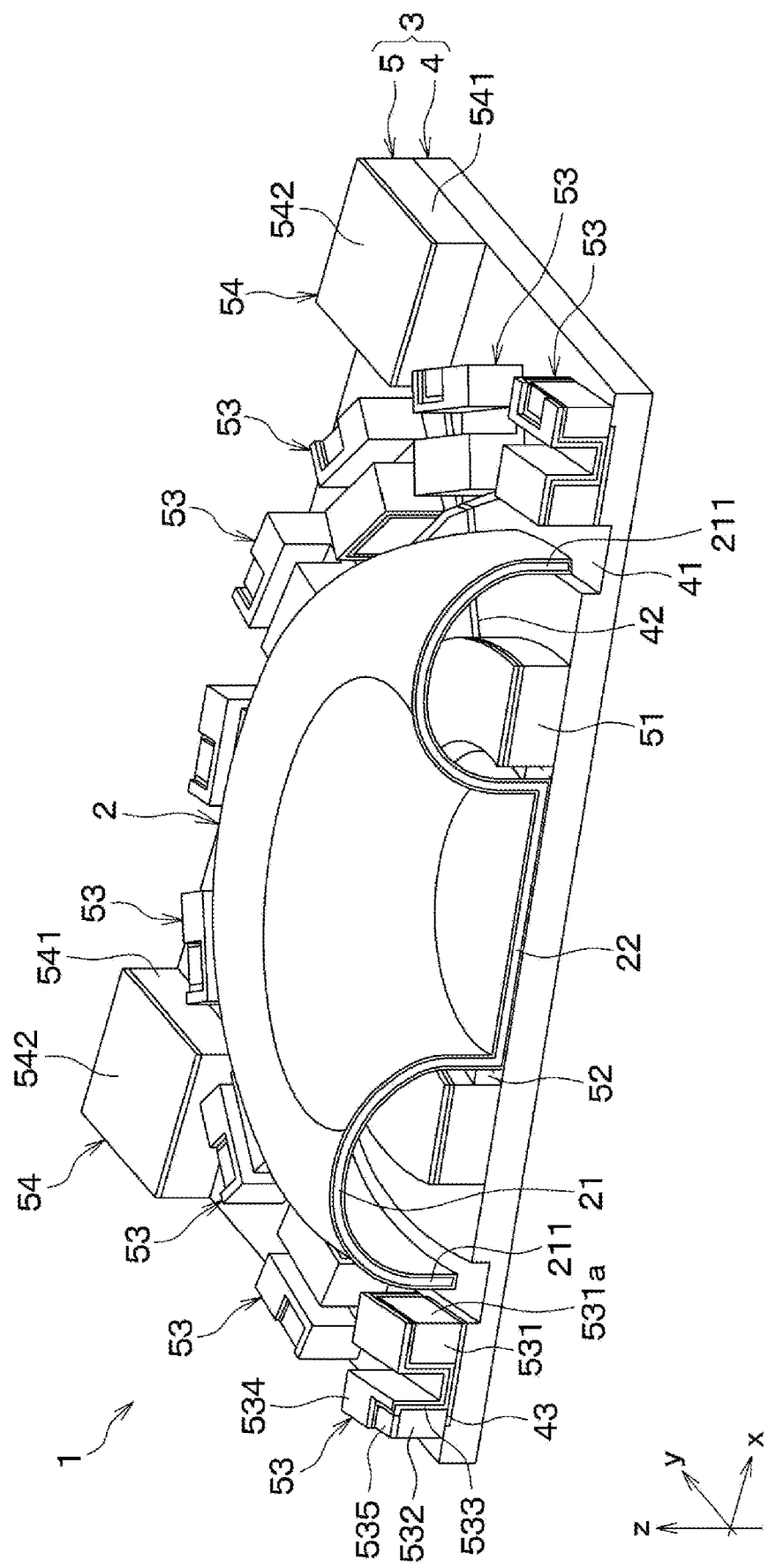
FIG. 2 is a diagram showing a sectional perspective view of the inertial sensor, including a sectional view, shown in FIG. 1.
Figure 3:
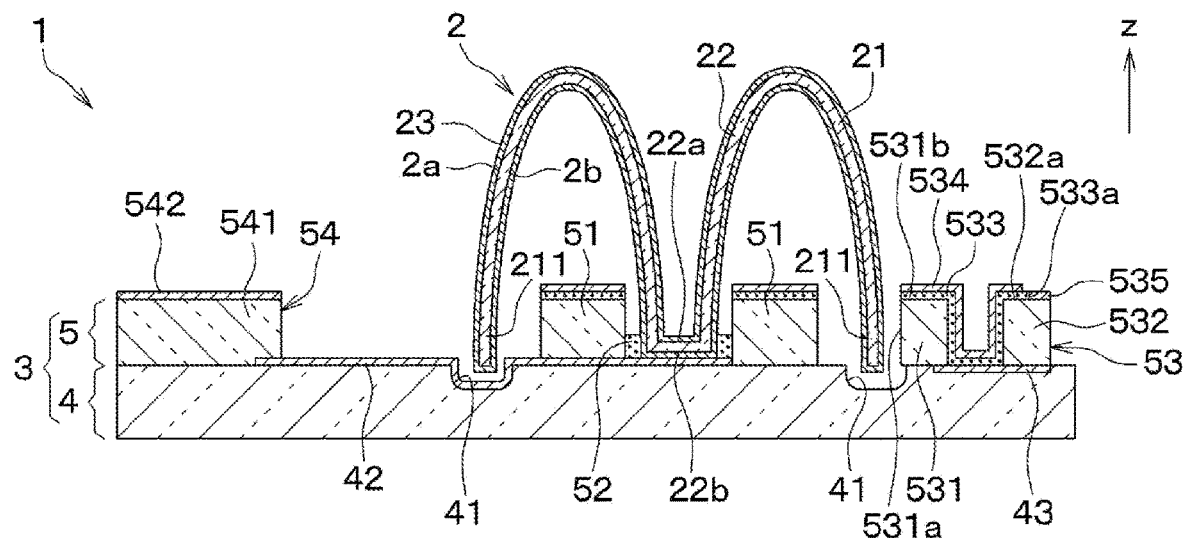
FIG. 3 is a diagram showing a cross-sectional view taken along a line III-III in FIG. 1.
Figure 4:
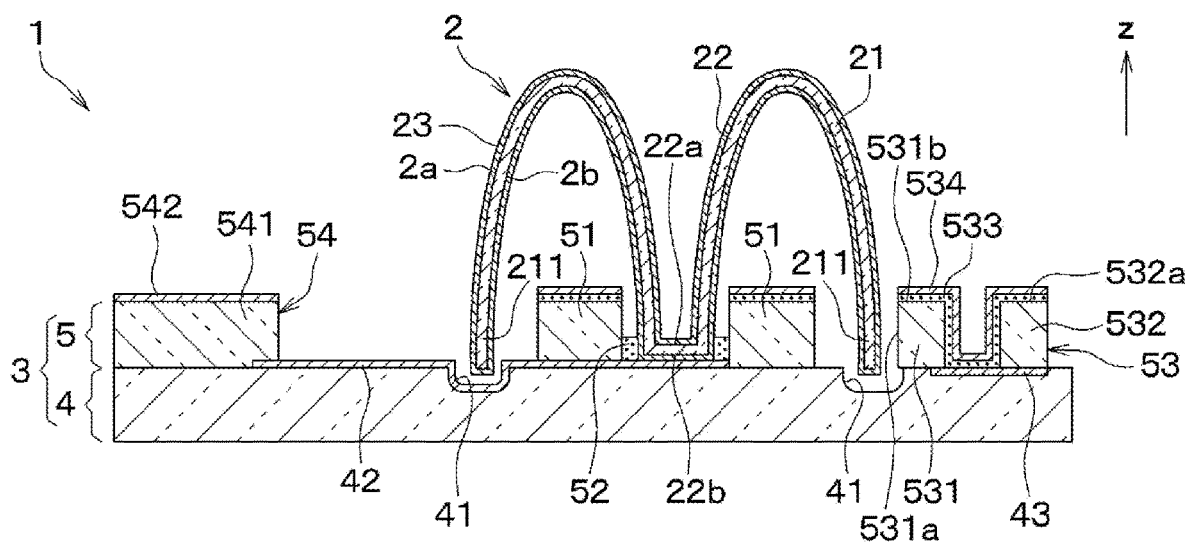
FIG. 4 is a diagram showing a cross-sectional view taken along a line IV-IV in FIG. 1.

For example, as shown in FIGS. 2 to 4, the micro vibrator 2 includes a curved surface portion 21 having a hemispherical three-dimensional curved surface, and a connecting portion 22 extending from a virtual vertex of the hemisphere formed by the curved surface portion 21 toward the center inside of the hemisphere. The connecting portion 22 defines a bottomed tubular recess, for example. In the micro vibrator 2, for example, the curved surface portion 21 has a bowl-shaped three-dimensional curved surface. The micro vibrator 2 has a Q factor of vibration that is $10^5$ or more.

An end of the curved surface portion 21 opposite to the connecting portion 22 is referred to as a rim 211. The rim 211 has, for example, a substantially cylindrical shape. The micro vibrator 2 is, for example, mounted on the mounting substrate 3, such that a front surface 2a of the rim 211 faces multiple electrode portions 53 of the mounting substrate 3, which will be described later, and such that the distances from the multiple electrode portions 53 are even. When the micro vibrator 2 is mounted on the mounting substrate 3, the curved surface portion 21 including the rim 211 is in a hollow state having no contact with other members on the mounting substrate 3. The micro vibrator 2 mounted on the mounting substrate 3 has a structure in which the hollow rim 211 can vibrate in a wineglass mode in accordance with voltage application to the multiple electrode portions 53.

The micro vibrator 2 has the front surface 2a and a back surface 2b opposite to the front surface 2a. The front surface 2a may also be referred to as an outer surface 2a. The front surface 2a has a larger diameter than the back surface 2b. For example, as shown in FIGS. 3 and 4, the micro vibrator 2 has a surface electrode 23 covering a part of or all of the front and back surfaces 2a and 2b. The micro vibrator 2 has a mounting surface 22b on the back surface 2b side of the connecting portion 22. The mounting surface 22b faces the mounting substrate 3. In the present embodiment, for example, a bottom surface of the connecting portion 22 opposite to the mounting surface 22b serves as a suction surface 22a used for suction-conveying the micro vibrator 2.

Although not particularly limited, the surface electrode 23 is, for example, provided by a lamination film including a chromium (Cr) or titanium (Ti) film on a base side and films of any conductive material such as gold (Au) and platinum (Pt), or by a single layer film including a base material such as titanium nitride (TiN) and a film made of a conductive material having an adhesion property with the base material. The surface electrode 23 is formed on the front surface 2a and the back surface 2b of the micro vibrator 2 by any film forming method such as sputtering, vapor deposition, or atomic layer deposition (ALD). In the present embodiment, the surface electrode 23 is formed on at least the mounting surface 22b and the front surface 2a or the back surface 2b of the rim 211, and these portions are electrically connected. The surface electrode 23 may have a solid shape that entirely covers the front and back surfaces 2a and 2b of the micro vibrator 2, or may be patterned to have the configuration described above so as to partly covers the front and back surfaces 2a and 2b. In the micro vibrator 2, a portion of the surface electrode 23 covering the mounting surface 22b of the connecting portion 22 is connected to a bridge wiring 42 of the mounting substrate 3 through a bonding member 52, which will be described later.

The micro vibrator 2 is made of, for example, quartz, glass containing additives such as borosilicate glass, metallic glass, silicon, ceramics or the like. Note that the material of the micro vibrator 2 is not limited to those materials as long as the micro vibrator 2 is formed to have the curved surface portion 21 with the three-dimensional curved shape and the connecting portion 22, and can vibrate in the wineglass mode. The micro vibrator 2 is a thin member and is formed, for example, by processing a thin base material made of the material described above in a forming process described later, so that the curved surface portion 21 and the connection portion 22 are thin on the order of micrometers, such as in a range from 10 micrometers (μm) to 100 μm. The micro vibrator 2 has a shape in a millimeter-order size. A dimension of the micro vibrator 2 in a direction along a thickness direction of the mounting substrate 3, that is, a direction orthogonal to the mounting substrate 3 is referred to as a height. For example, the height of the micro vibrator 2 is 2.5 mm, and the outer diameter of the rim 211 defined by the front surface 2a is 5 mm. The forming process of the micro vibrator 2 will be described later.

As shown in FIG. 1, for example, the mounting substrate 3 includes a lower substrate 4 and an upper substrate 5, which are bonded to each other. For example, the lower substrate 4 is made of borosilicate glass, which is an insulating material, and the upper substrate 5 is made of silicon (Si), as a semiconductor material. The mounting substrate 3 is, for example, formed by anodically bonding the upper substrate 5 to the lower substrate 4. For example, the mounting substrate 3 includes, in the upper substrate 5, an inner frame portion 51, multiple first electrode portions 53 and multiple second electrode portions 54. The multiple first electrode portions 53 are arranged apart from each other while surrounding the inner frame portion 51. The second electrode portions 54 are arranged apart from each other in areas outside the first electrode portions 53. In addition, the mounting substrate 3 has, in the lower substrate 4, an annular groove 41 and multiple bridge wirings 42. The annular groove 41 surrounds the inner frame portion 51 so as to separate the inner frame portion 51 from the first electrode portions 53. The bridge wirings 42 bridge over the groove 41 from an inner area to an outer area of the groove 41.

For example, as shown in FIGS. 3 and 4, the groove 41 is provided between the inner frame portion 51 and the multiple first electrode portions 53, and is formed by wet etching or the like. The groove 41 has, for example, a dimension corresponding to the outer diameter of the rim 211 of the micro vibrator 2. The groove 41 is provided so as to avoid contacting of the rim 211 to the mounting substrate 3, when the micro vibrator 2 is mounted on the mounting substrate 3.

The multiple bridge wirings 42 are formed of a conductive material such as aluminum (Al), for example. All of the multiple bridge wirings 42 are arranged to extend between the multiple first electrode portions 53 and are electrically independent of the multiple first electrode portions 53. For example, as shown in FIGS. 3 and 4, the bridge wiring 42 saddles the etching groove 41 in the lower substrate 4. A part of the bridge wiring 42 including a first end is connected to an inner region surrounded by the inner frame portion 51 and a second end of the bridge wiring 42 is connected to the second electrode portion 54. The first end of the bridge wiring 42 is connected to the surface electrode 23 of the micro vibrator 2 inside the inner frame portion 51. Thus, the bridge wiring 42 electrically connects the surface electrode 23 and the second electrode portion 54.

The inner frame portion 51 has, for example, one annular shape as a whole when viewed from the top, and the connecting portion 22 of the micro vibrator 2 is received inside of the inner frame portion 51. The inner frame portion 51 has dimensions such that at least the outer surface thereof does not contact the micro vibrator 2, as shown in FIGS. 3 and 4, for example. As another example, the inner frame portion 51 may have a configuration obtained by dividing one annular frame into multiple pieces along the circumferential direction. Also, the inner frame portion 51 may have an inner size and a shape that match the outer diameter and shape of the connecting portion 22 of the micro vibrator 2 on the back surface 2b side, so that the inner frame portion 51 has a function of positioning the micro vibrator 2 to the mounting substrate 3, when the micro vibrator 2 is placed on the mounting substrate 3.

The bonding member 52 is a conductive material used for bonding the micro vibrator 2 and the mounting substrate 3. The bonding member 52 electrically connects the first end of the bridge wiring 42 and the surface electrode 23 of the micro vibrator 2. The bonding member 52 is, for example, a paste-like conductive material containing a conductive material such as gold tin (AuSn), silver (Ag), or gold (Au), and is applied to the area surrounded by the inner frame portion 51 using a syringe or the like.

For example, as shown in FIG. 1, the multiple first electrode portions 53 are arranged apart from each other so as to surround the inner frame portion 51 and the micro vibrator 2 at positions on the outer peripheral side of the groove 41. Some of the multiple first electrode portions 53 function as drive electrodes that generate electrostatic attraction to the micro vibrator 2 when applied with a voltage to drive and vibrate the micro vibrator 2. Some of the multiple first electrode portions 53 function as detection electrodes that form capacitors together with the rim 211 of the micro vibrator 2 at portions facing the rim 211 for detecting the capacitance of the capacitors.

For example, as shown in FIG. 2, each of the multiple first electrode portions 53 includes a first base portion 531 facing the rim 211 and a second base portion 532 disposed opposite to the rim 211 with respect to the first base portion 531. The first electrode portion 53 includes, for example, an insulating film 533 covering the first base portion 531 and the second base portion 532, a guard electrode 534 arranged on the insulating film 533, and a lead-out electrode 535 arranged on the second base portion 532.

In the first electrode portion 53, at least a facing surface 531a of the first base portion 531 facing the rim 211 is exposed from the insulating film 533 and the guard electrode 534. In the first electrode portion 53, for example, as shown in FIG. 1, the entirety of the first base portion 531 except for the facing surface 531a is covered with the insulating film 533 and the guard electrode 534. For example, the entirety of the second base portion 532 except for an opposite surface opposite to the first base portion 531 is covered with the insulating film 533 and the guard electrode 534. The first base portion 531 and the second base portion 532 are arranged, for example, on a conductive layer 43 formed on the lower substrate 4. The first base portion 531 and the second base portion 532 are electrically connected to each other via the conductive layer 43. In the first electrode portion 53, as shown in FIG. 3, therefore, it is possible to apply the voltage to the first base portion 531 via the conductive layer 43 by applying the voltage to the lead-out electrode 535 formed on the surface 532a of the second base portion 532.

The first base portion 531 and the second base portion 532 are separated by conducting etching on a conductive silicon substrate forming the upper substrate 5, for example. Thus, the first base portion 531 and the second base portion 532 are made of the same material. In a case where the first electrode portion 53 is provided by two separate base portions, the bonding area with the lower substrate 4 and the upper substrate 5 is smaller than that of a case where the first electrode portion 53 is provided by a single large base portion. As a result, the thermal stress applied to the lower substrate 4 can be reduced.

The insulating film 533 is made of an insulating material such as tetra ethoxy silane (TEOS), and is, for example, formed by a plasma chemical vapor deposition (CVD) or the like. The insulating film 533 is formed on a predetermined region including at least an upper surface 531b of the first base portion 531 and a surface of the second base portion 532, excluding the facing surface 531a of the first base portion 531. Thus, the guard electrode 534 is electrically independent of the first base portion 531 and the second base portion 532.

The guard electrode 534 is a conductive film that is disposed on the insulating film 533 and covers at least the upper surface 531b of the first base portion 531. The guard electrode 534 is, for example, made of any conductive material, such as Au or Al, and formed in the same process as the lead-out electrode 535 by sputtering or the like. For example, a wire (not shown) is connected to the guard electrode 534, so that the potential can be adjusted from the outside. The guard electrode 534 shields an electrical influence from the surfaces of the first base portion 531 other than the facing surface 531a onto the rim 211 of the micro vibrator 2. Thus, the guard electrode 534 functions to reduce noise in the detection of capacitance, and hence improve detection accuracy. In other words, the guard electrode 534 concentrates the electric field in the gap between the facing surface 531a of the first electrode portion 53 and the rim 211, and restricts an unintended electric field from generating from a portion of the first electrode portion 53 other than the facing surface 531a. The details will be described later.

The lead-out electrode 535 is a conductive film formed in the contact hole 533a of the insulating film 533 on the surface 532a of the second base portion 532. The lead-out electrode 535 is used to apply a voltage to the first base portion 531 via the second base portion 532 and to detect electrostatic capacity. The lead-out electrode 535 is electrically independent of the guard electrode 534. The lead-out electrode 535 is electrically connectable with an external device through a wire connected thereto.

For example, as shown in FIG. 1, the second electrode portions 54 are arranged on the outer peripheral side of the first electrode portions 53 on the mounting substrate 3, and is used to apply a voltage to the surface electrode 23 of the micro vibrator 2. For example, as shown in FIG. 3, the second electrode portion 54 includes a base portion 541 and an electrode pad 542 covering a part of the base portion 541. For example, the second electrode portions 54 are formed in the same number as the wirings 42. The base portion 541 of the second electrode portion 54 is arranged on the second end of the wiring 42 opposite to the micro vibrator 2, and is electrically connected to the wiring 42. As such, the voltage can be applied from the second electrode portion 54 to the surface electrode 23 of the micro vibrator 2 via the electrode pad 542, the base portion 541, the wiring 42 and the bonding member 52.

The base portion 541 is a portion that is separated from the inner frame portion 51 and the first electrode portions 53 by conducting, for example, etching on a conductive silicon forming the upper substrate 5. The electrode pad 542 is made of, for example, the same arbitrary conductive material as the guard electrode 534 and the lead-out electrode 535, and is formed in the same process as these by sputtering or the like. The electrode pad 542 is connected to, for example, a wire (not shown), similarly to the lead-out electrode 535. Thus, the electrode pad 542 is electrically connectable to an external device through the wire connected thereto.

The mounting structure 1 of the present embodiment has the basic configuration as described hereinabove. In the mounting structure 1, at least the upper surface 531b of the first electrode portion 53 is covered with the guard electrode 534, which is electrically independent of the first base portion 531, so that the electrical influence from the upper surface 531b toward the upper side surface of the rim 211 is reduced.

[Effect of Guard Electrode]

Figure 5A:
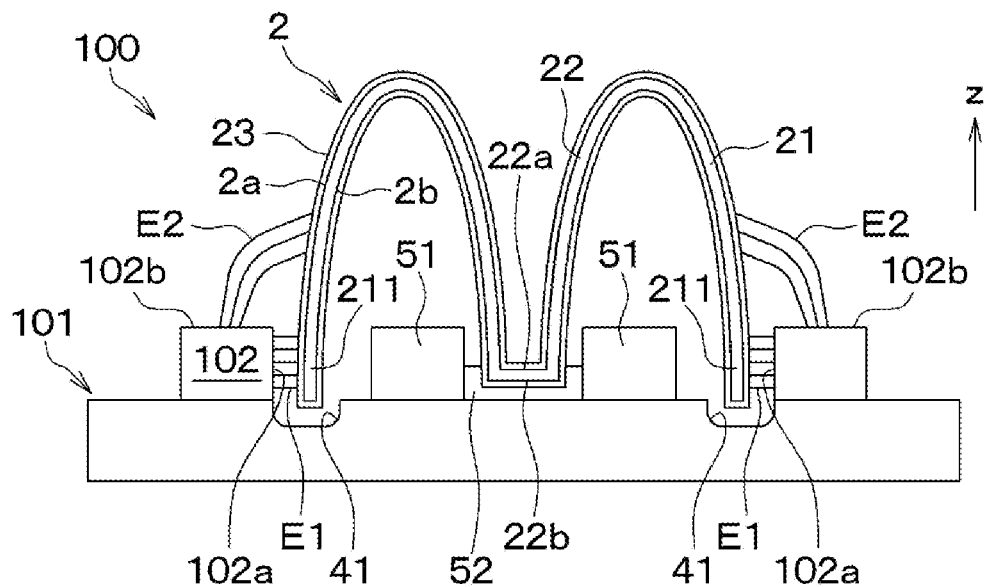
FIG. 5A is an explanatory diagram for explaining noise generation due to an upper surface of an electrode portion in a mounting structure of a comparative example.

Next, the noise reduction effect by the guard electrode 534 will be described. FIG. 5A shows a mounting structure 100 of a comparative example that does not have the guard electrode 534. First, noise generation in the mounting structure 100 of the comparative example will be described.

As shown in FIG. 5A, for example, the mounting structure 100 of the comparative example has the micro vibrator 2 bonded to a mounting substrate 101 so that a curved surface portion 21 of the micro vibrator 2 is in a hollow state and does not contact with other members. The mounting substrate 101 has multiple first electrodes 102 facing the rim 211 of the micro vibrator 2 with a predetermined distance therebetween. The first electrodes 102 function as drive electrodes for driving the micro vibrator 2 and detection electrodes for detecting electrostatic capacitance. A wire (not shown) or the like is connected to the first electrode 102 so that the first electrode 102 can be electrically connected to an external device. However, the first electrode 102 does not have a guard electrode on its upper surface.

In the mounting structure 100 of the comparative example, a direct current (DC) voltage is applied to the micro vibrator 2 through wiring or the like (not shown), and an alternate current (AC) voltage is applied to the first electrode 102, thereby exciting the curved surface portion 21 of the micro vibrator 2. In this state, the capacitance between the rim 211 of the micro vibrator 2 and the first electrode 102 is detected.

In general, When the AC voltage, that is, an AC drive signal is applied to electrodes or the like, electromagnetically induced radiation noise is generated. When the charge of the first electrode 102 is defined as Q, the capacitance is defined as C, and the voltage is defined as V, a relation of Q=CV is established. Further, the current when the AC drive signal is applied to the first electrode 102 is defined as i, and the time is defined as t. Thus, the charge Q of the first electrode 102 is expressed by the following equation 1.

$$Q=\int i\,dt=CV \qquad \text{[Equation 1]}$$

Further, the following equation 2 is obtained by differentiating the equation 1 with respect to the time t.

$$i = \frac{dC}{dt}V + C\frac{dV}{dt} \qquad \text{[Equation 2]}$$

The voltage V includes noise. Thus, when the signal component is defined as $V_s$ and the noise component is defined as $V_n$, the relation of $V=V_s+V_n$ is established. When the relation of $V=V_s+V_n$ is substituted into the equation 2 above, the following equation 3 is obtained.

$$i = \frac{dC}{dt}(V_s + V_n) + C\left(\frac{dV_s}{dt} + \frac{V_n}{dt}\right) \qquad \text{[Equation 3]}$$

For example, as shown in FIG. 5A, the first electrode 102 generates lines of electric force E1 from the surface facing in parallel with the rim 211, and lines of electric force E2 directing toward the upper side surface of the rim 211 from the upper surface in the z direction. The capacitance C and the electric charge Q of the first electrode 102 are, respectively, divided into the capacitance $C_g$ and the electric charge $Q_g$ of the gap with the lower end of the rim 211 in the z direction and the capacitance $C_f$ and the electric charge $Q_f$ of the fringe effect of the upper side surface of the rim 211 in the z direction. That is, the capacitance C and the charge Q can be expressed as $C=C_g+C_f$ and $Q=Q_g+Q_f$. When these expressions are substituted into the equation 3, the following equation 4 is obtained. Note that the fringe effect is an effect that in which the electrical characteristics are affected by the peripheral portions of the opposing electrode surfaces, and is also called an "edge effect."

$$i = \frac{d(C_g + C_f)}{dt}(V_s + V_n) + (C_g + C_f)\frac{d(V_s + V_n)}{dt} \qquad \text{[Equation 4]}$$

Figure 5B:
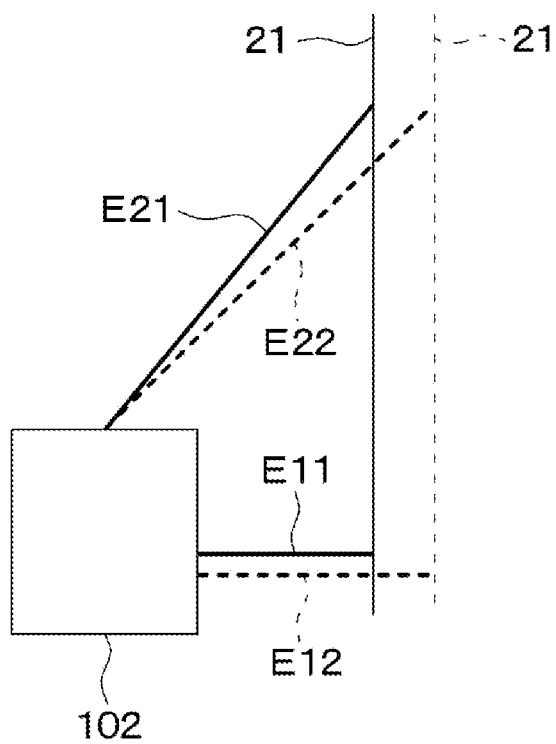
FIG. 5B is an explanatory diagram for explaining changes in lines of electric force due to excitation of a micro vibrator in the mounting structure of the comparative example.

Also, the lines of electric forces E1 and E2 have different magnitudes of change in length due to the excitation of the micro vibrator 2. Specifically, for example, as shown in FIG. 5B, the lines of electric forces E1 and E2 when the curved surface portion 21 of the vibrating micro vibrator 2 is closest to the first electrode 102 are defined as E11 and E21, respectively. Also, the lines of electric forces E1 and E2 when the curved surface portion 21 of the vibrating micro vibrator 2 is farthest from the first electrode 102 are defined as E12 and E22, respectively.

Note that FIG. 5B shows only a part of the outline of the first surface 2a of the curved surface portion 21 of the micro vibrator 2 which is vibrating. The part of the outline when the micro vibrator 2 is at the position closest to the first electrode 102 is shown with a solid line, and the part of the outline when the micro vibrator 2 is at the position farthest from the first electrode 102 is shown with a dashed line.

In this case, a distance between the facing surface 102a of the first electrode 102 and the rim 211 is defined as d1. Since the distance d1 is short, the ratio of change in the line of the electric force E1 due to the excitation of the micro vibrator 2, that is, a ratio of the difference between the lines of electric forces E11 and E12 to the entire line of electric force E1 is large. On the other hand, when a distance between the upper surface 102b of the first electrode 102 and the upper side surface of the rim 211 is defined as d2, the distance d2 is longer than the distance d1. Therefore, the ratio of change in the length of the line of the electric force E2 due to the excitation of the micro vibrator 2 is relatively smaller than that of the line of electric force E1. The ratio of change in the length of the line of the electric force E2 is a ratio of the difference between the lines of electric forces E21 and E22 to the entire line of electric force E2. Therefore, assuming that the time change of the capacitance $C_f$ by the fringe effect is small. When the relation of $dC_f/dt=0$ is substituted into the equation 4, the following equation 5 is obtained.

$$i = \frac{dC_g}{dt}(V_s + V_n) + C_g \frac{d(V_s + V_n)}{dt} + C_f \frac{d(V_s + V_n)}{dt} \quad \text{[Equation 5]}$$

According to the equation 5, since the mounting structure 100 of the comparative example has the capacitance $C_f$ by the fringe effect, $C_f dV_n/dt$ in the third term on the right side becomes a noise component and is superimposed on the current i.

In contrast, in the mounting structure 1 of the first embodiment, since the upper surface 531b of the first base portion 531 of the first electrode portion 53 is covered with the guard electrode 534, the line of electric force directing from the upper surface 531b toward the upper side surface of the rim 211 is shielded. Therefore, the capacitance $C_f$ due to the fringe effect is reduced, and the noise component $C_f dV_n/dt$ is thus reduced. As a result, the noise component superimposed on the current i in the detection electrode of the first electrode portion 53 is reduced, and the detection accuracy of the capacitance between the facing surface 531a and the rim 211 is improved.

[Method for Manufacturing Mounting Structure]

Next, an example of a method for manufacturing the mounting structure 1 of the present embodiment will be described. First, the micro vibrator 2 is formed, for example, by the following process.

Figure 6A:
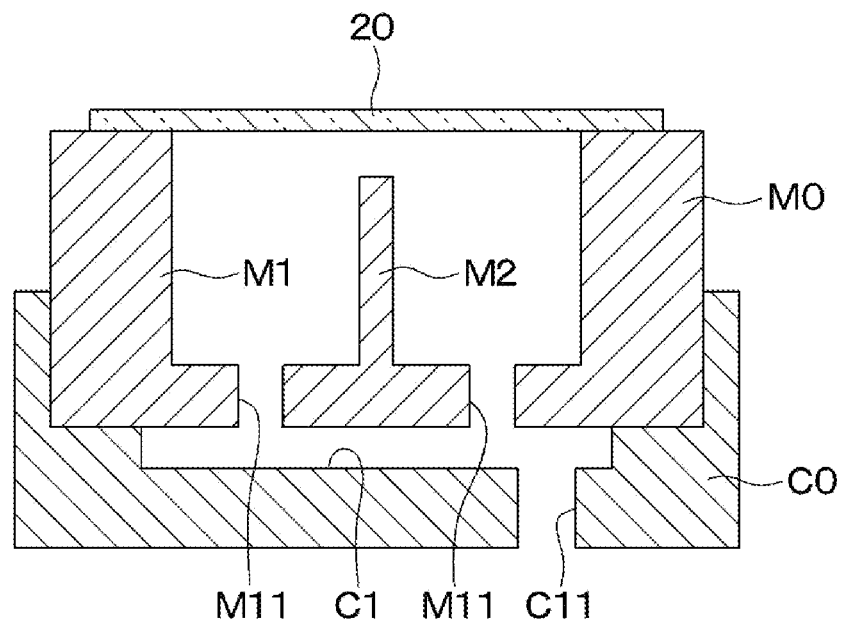
FIG. 6A is a diagram showing a cross-sectional view of a process of preparing a member in a micro vibrator forming process.

First, for example, as shown in FIG. 6A, a quartz plate 20, a mold MO for forming the shape of the three-dimensional curved surface, and a cooling body CO for cooling the mold MO are prepared. For example, the mold MO has a recessed portion M1 and a support portion M2. The recessed portion M1 defines a space for forming the shape of the three-dimensional curved surface on the quartz plate 20. The support portion M2 is provided at the center of the recessed portion M1, and extends along a depth direction of the recessed portion M1. The support portion M2 supports a part of the quartz plate 20 during the processing. The mold MO has a through hole M11 for pressure reduction in the bottom surface of the recessed portion M1. The cooling body CO has a fitting portion C1, into which the mold M is fitted, and an exhaust port C11 formed on the bottom of the fitting portion C1 and is used for exhaust. The cooling body CO is provided to cool the mold MO when the quartz plate 20 is processed. The quartz plate 20 is arranged so as to cover an entire area of the recessed portion M1 of the mold MO.

Figure 6B:
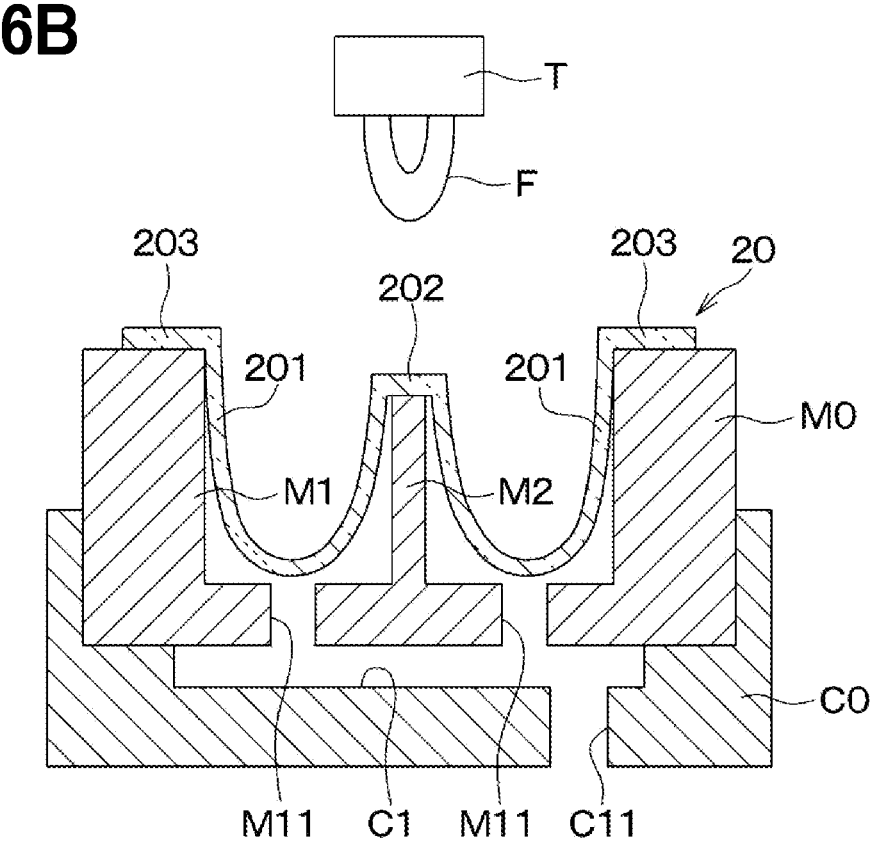
FIG. 6B is a diagram showing a cross-sectional view of the micro vibrator forming process subsequent to FIG. 6A.

Then, for example, as shown in FIG. 6B, a flame F is applied from a torch T toward the quartz plate 20 to melt the quartz plate 20. At this time, the recessed portion M1 of the mold MO is evacuated through the exhaust port C11 of the cooling body C by a vacuum mechanism (not shown). As a result, the melted portion of the quartz plate 20 is stretched toward the bottom surface of the recessed portion M1. In addition, a central and peripheral region of the melted portion of the quartz plate 20 is supported by the support portion M2. Thereafter, the heating of the quartz plate 20 is stopped and the quartz plate 20 is cooled. As a result, the quartz plate 20 is formed into a shape including a curved surface portion 201 with a substantially hemispherical three-dimensional curved surface shape and a recessed portion 202 recessing from the central portion of the curved surface portion 201 along the outer shape of the support portion M2. Further, a portion of the quartz plate 20, which is located on the outside of the recessed portion M1, is formed as an end portion 203, which is located at the outer peripheral edge of the curved surface portion 201 and has a flat shape.

Figure 6C:
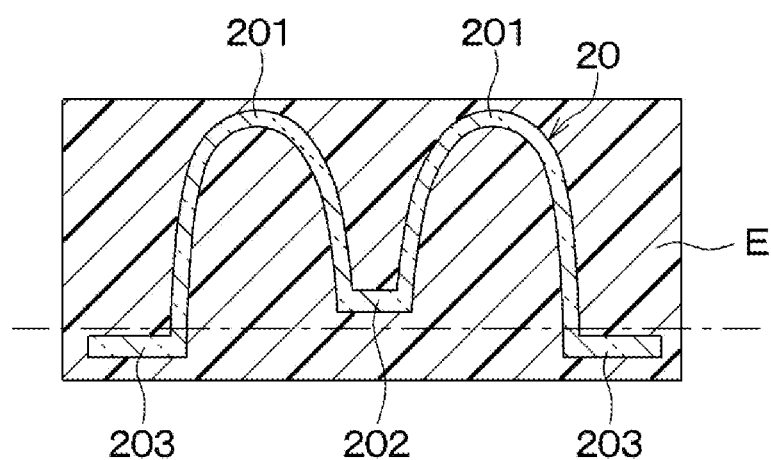
FIG. 6C is a diagram showing a cross-sectional view of the micro vibrator forming process subsequent to FIG. 6B.

Subsequently, the recessed portion M1 of the mold MO is returned to be in a state of normal pressure, and the processed quartz plate 20 is removed from the mold MO. For example, as shown in FIG. 6C, the quartz plate 20 is encapsulated with an encapsulating material E, which is made of any curable resin material. Thereafter, the encapsulating material E is ground and polished by chemical mechanical polishing (CMP) from a surface adjacent to the end portion 203 up to a position indicated by a chain dashed line shown in FIG. 6C, so the end portion 203 is removed together with the encapsulating material E. As a result, the quartz plate 20 is formed into the shape having the curved surface portion 21 with an annular curved surface and the connecting portion 22 recessed from the top of the curved surface portion 21.

Then, all the sealing material E is removed by a method such as heating or melting using a chemical solution, and the quartz plate 20 is taken out. Finally, the surface electrode 23 is formed on both the front and back surfaces of the quartz plate 20 which has been processed as described above by, for example, a film forming process such as sputtering or vapor deposition. The surface electrode 23 may be patterned by a known method such as using a mask (not shown) or the like, if necessary.

The micro vibrator 2 is produced by, for example, the manufacturing process as described above. However, the manufacturing process of the micro vibrator 2 is not limited to the example described above. For example, in place of the flame F by the torch T shown in FIG. 6B, the heat source for melting the quartz plate 20 may be provided by a heater that is configured to heat the quartz plate 20 in the same area as when the flame F is used. As described above, the manufacturing process of the micro vibrator 2 may be appropriately changed, and other known methods may be adopted.

The micro vibrator 2 has a substantially half-toroidal shape that is rotationally symmetrical about the Z direction as a rotation axis. However, the shape of the micro vibrator 2 is not limited to the shape of the bird-bath resonator (BR) described above as long as the curved surface portion 21 has a bowl-shaped three-dimensional curved surface shape, and is configured to vibrate in the wineglass mode. For example, the connecting portion 22 may have a columnar shape, other than the bottomed cylindrical shape defining the recess.

Figure 8A:
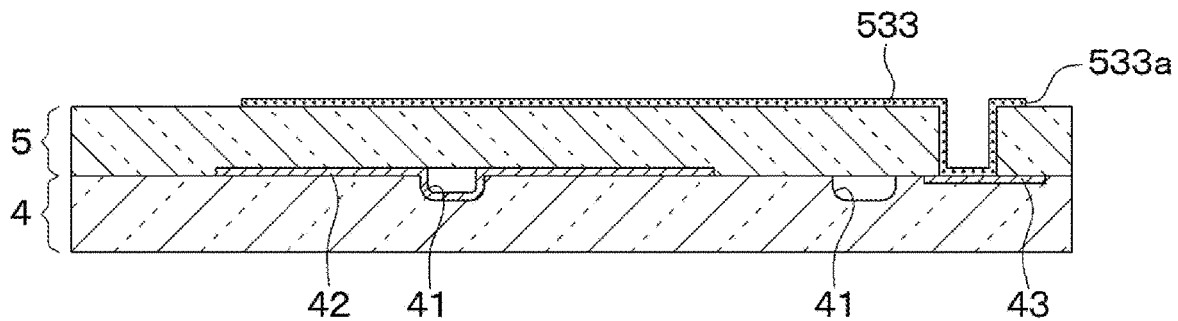
FIG. 8A is a diagram showing a cross-sectional view of a process subsequent to the process shown in FIG. 7D.

Next, the process of forming the mounting substrate 3 and the process of mounting the micro vibrator 2 on the mounting substrate 3 will be described. Note that FIGS. 8A to 8F, which will be described later, show cross sections corresponding to FIG. 3. Also, FIGS. 9A to 9F, which will be described later, show cross sections corresponding to FIG. 4. FIG. 8A and FIG. 9A show the same process. Likewise, FIG. 8B and FIG. 9B, FIG. 8C and FIG. 9C, FIG. 8D and FIG. 9D, FIG. 8E and FIG. 9E, and FIG. 8F and FIG. 9F show the same process, respectively.

Figure 7A:
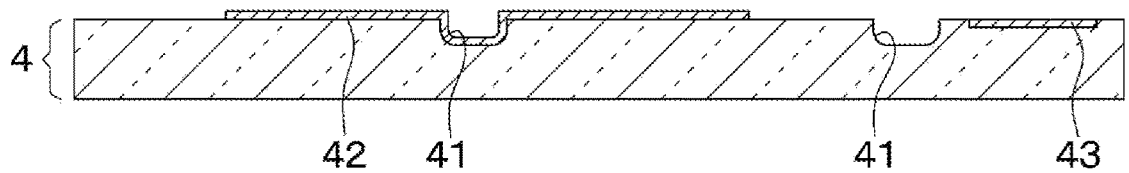
FIG. 7A is a diagram showing a cross-sectional view of a process of forming a mounting substrate in a manufacturing process of the inertial sensor according to the first embodiment.

First, an insulating glass substrate to be the lower substrate 4 is prepared. For example, as shown in FIG. 7A, after forming the groove 41 by etching, the wiring 42 and the conductive layer 43 are formed by sputtering using a mask (not shown).

Figure 7B:
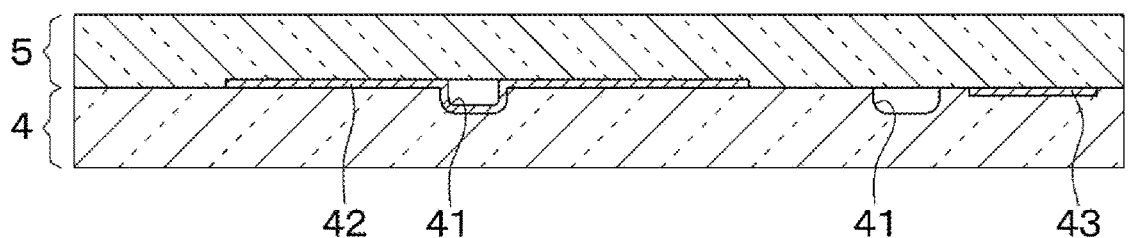
FIG. 7B is a diagram showing a cross-sectional view of a process subsequent to the process shown in FIG. 7A.

Subsequently, as shown in FIG. 7B, for example, the upper substrate 5 made of conductive silicon or the like is prepared. The upper substrate 5 is anodically bonded to the surface of the lower substrate 4 on which the groove 41 and the like have been formed.

Figure 7C:
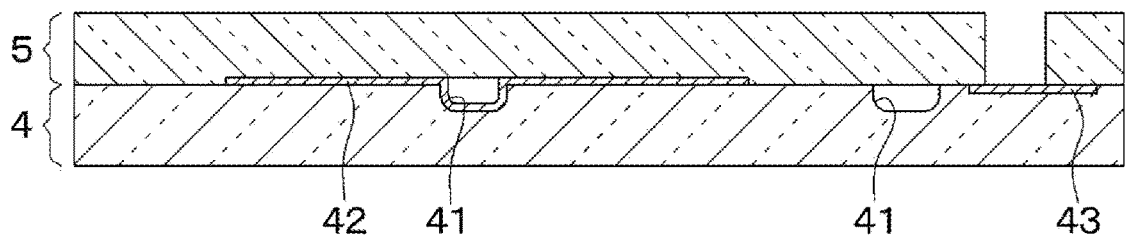
FIG. 7C is a diagram showing a cross-sectional view of a process subsequent to the process shown in FIG. 7B.

Thereafter, as shown in FIG. 7C, for example, the upper substrate 5 is trench-etched by a deep reactive ion etching (DRIE) method or the like to partially expose the lower substrate 4, so that regions including the multiple second base portions 532, which are constituent elements of the multiple first electrode potions 53 formed later, are separated from the other regions of the upper substrate 5.

Figure 7D:
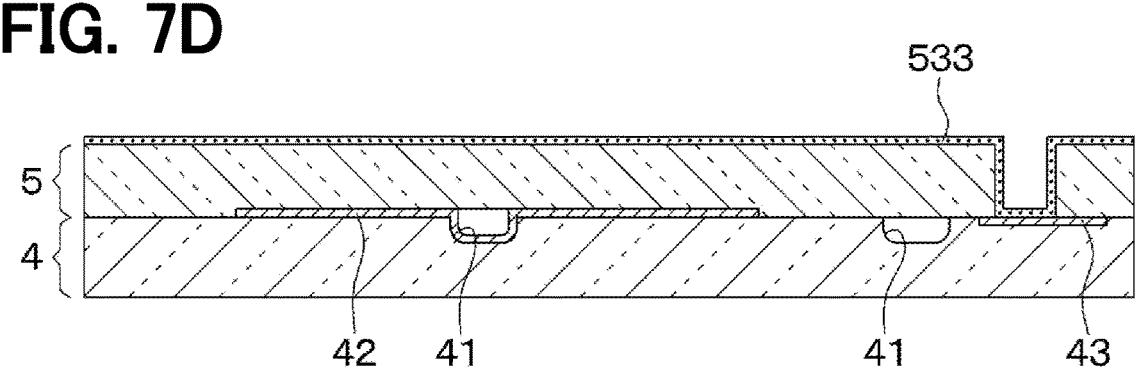
FIG. 7D is a diagram showing a cross-sectional view of a process subsequent to the process shown in FIG. 7C.

Then, as shown in FIG. 7D, an insulating film 533 made of TEOS is formed, for example, by a plasma CVD method or the like so as to cover the upper substrate 5 and the portion of the lower substrate 4 exposed from the upper substrate 5.

Next, for example, a resist film (not shown) having a predetermined pattern is formed by photolithography, and a dry etching is performed to partially remove the insulating film 533. Then, the resist film (not shown) is removed. As a result, for example, as shown in FIG. 8A, a contact hole 533a is formed in the insulating film 533 covering the upper substrate 5 to expose a part of the upper substrate 5 corresponding to the second base portion 532, and a region of the upper electrode 5 corresponding to the second electrode portion 54 later is exposed from the insulating film 533. In this case, an area of the surface 532a of the second base portion 532 other than the area where the lead-out electrode 535 is to be formed is covered with the insulating film 533, for example, as shown in FIG. 9A.

Figure 8B:
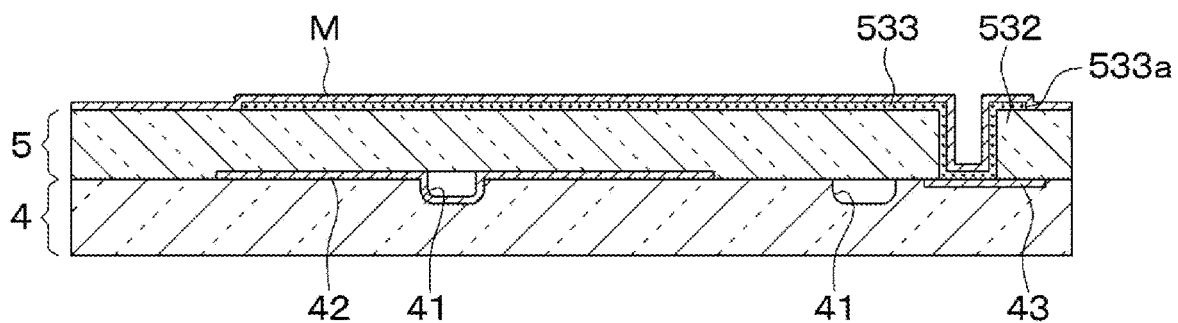
FIG. 8B is a diagram showing a cross-sectional view of a process subsequent to the process shown in FIG. 8A.
Figure 9A:
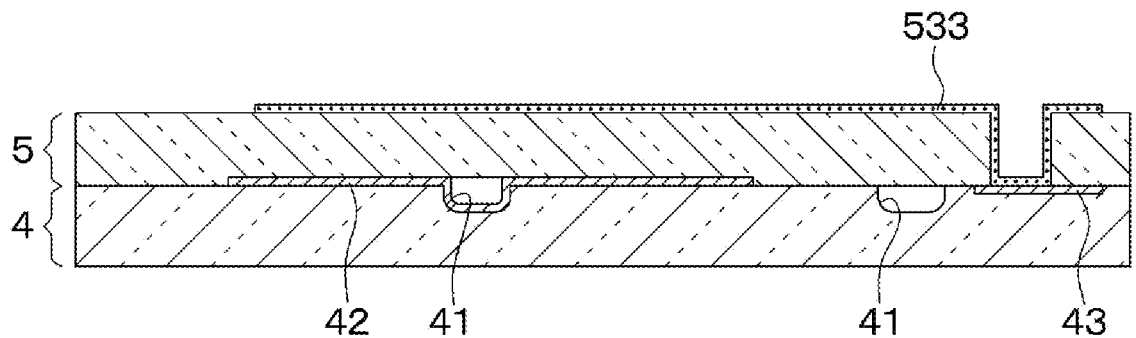
FIG. 9A is a diagram showing a cross-sectional view of a process subsequent to the process shown in FIG. 7D.
Figure 9B:
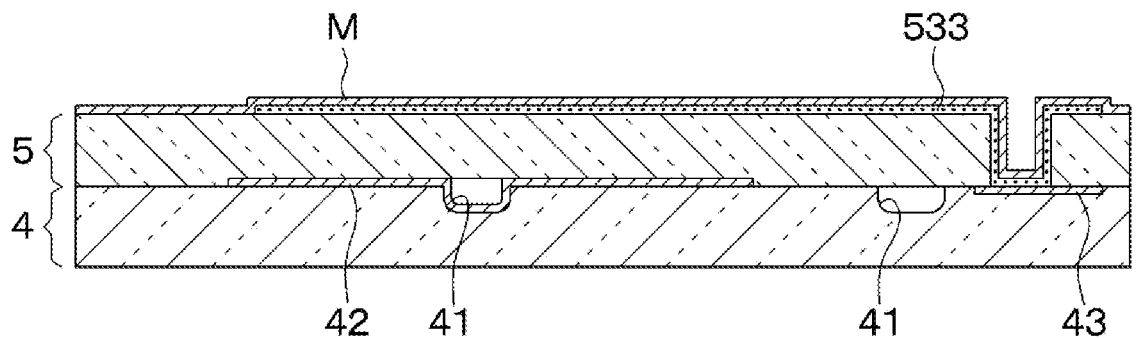
FIG. 9B is a diagram showing a cross-sectional view of a process subsequent to the process shown in FIG. 9A.

Subsequently, sputtering or the like is performed using a mask (not shown) to form a metal film M covering the upper substrate 5 and the insulating film 533, for example, as shown in FIGS. 8B and 9B.

Figure 8C:
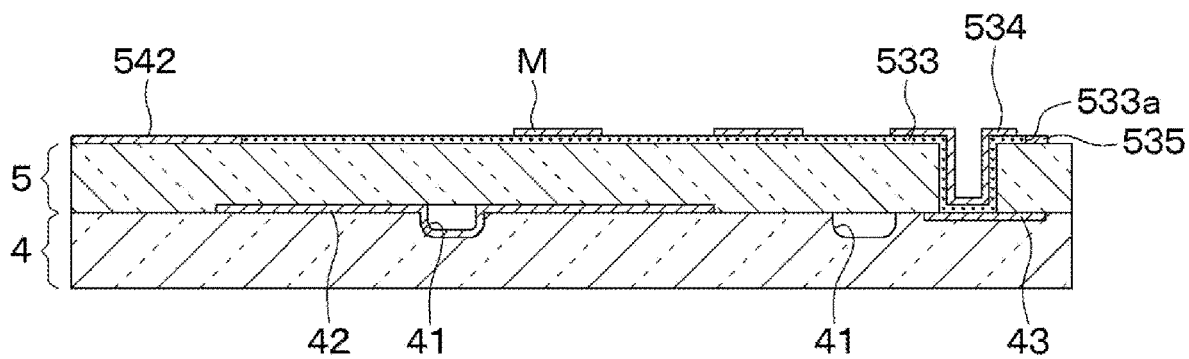
FIG. 8C is a diagram showing a cross-sectional view of a process subsequent to the process shown in FIG. 8B.
Figure 9C:
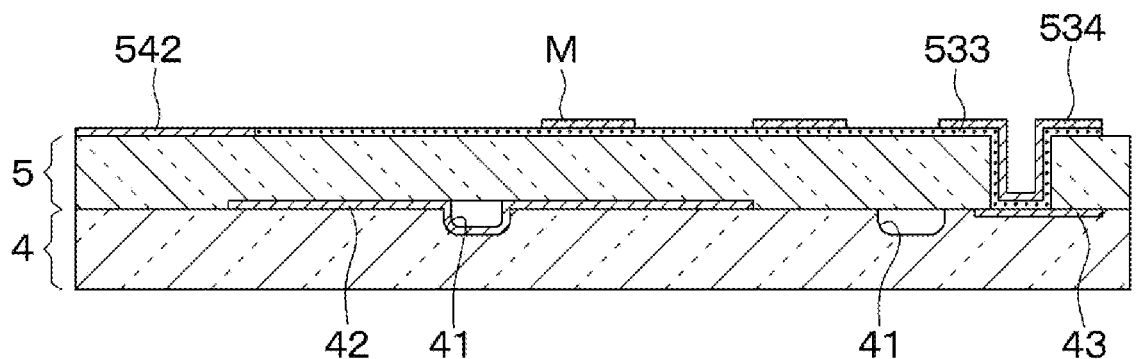
FIG. 9C is a diagram showing a cross-sectional view of a process subsequent to the process shown in FIG. 9B.

Thereafter, the metal film M is patterned by, for example, a photolithographic etching method to separate a portion of the metal film M disposed on a portion of the upper substrate 5 exposed from the insulating film 533 and a portion of the metal film M covering the insulating film 533 on the upper substrate 5 from each other to be electrically independent. As a result, for example, as shown in FIGS. 8C and 9C, the electrode pad 542 that covers the second electrode portion 54 later, the guard electrode 534 that covers the portion corresponding to the first base portion 531, and the lead-out electrode 535 covering the part of the second base portion 532 are formed. Also, the electrode pad 542, the guard electrode 534 and the lead-out electrode 535 are electrically insulated from the portion of the metal film M covering the insulating film 533. At this time, the metal film M left on the insulating film 533 includes portions to be on the inner frame portion 51 and the first base portion 531 and a portion extending over the first base portion 531 and the second base portion 532.

Figure 8D:
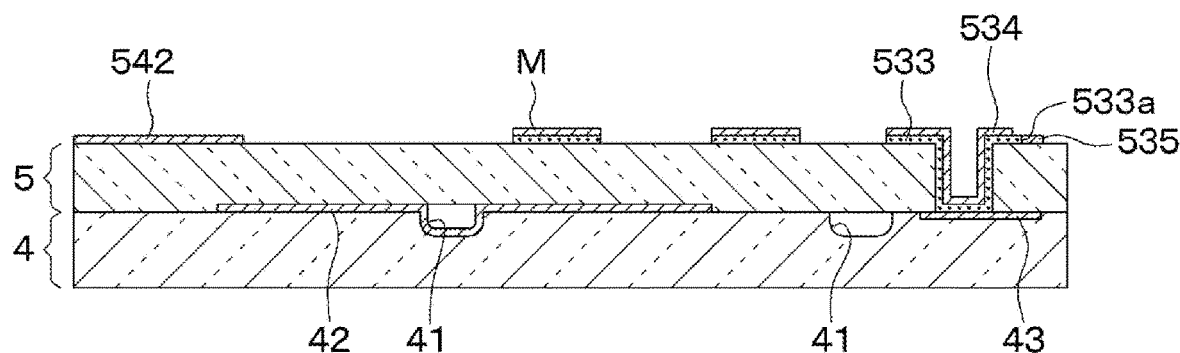
FIG. 8D is a diagram showing a cross-sectional view of a process subsequent to the process shown in FIG. 8C.
Figure 9D:
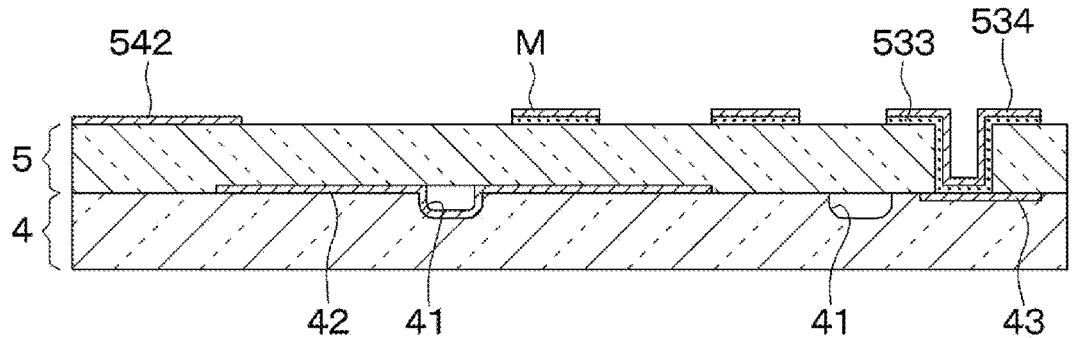
FIG. 9D is a diagram showing a cross-sectional view of a process subsequent to the process shown in FIG. 9C.

Then, for example, as shown in FIGS. 8D and 9D, portions of the insulating film 533 exposed from the metal film M, except for regions in the vicinity of the lead-out electrode 535 and the electrode pad 542, are removed by dry etching or the like in the same manner as described above, so that upper electrode 5 is partly exposed.

Figure 8E:
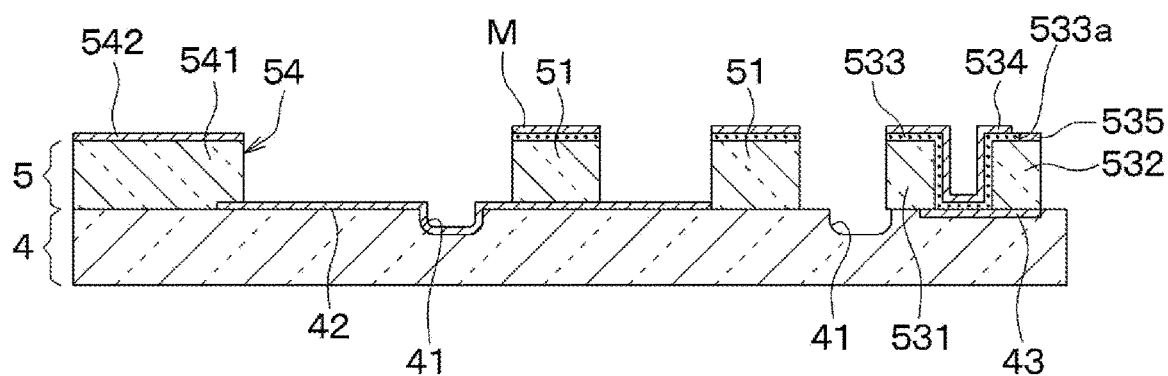
FIG. 8E is a diagram showing a cross-sectional view of a process subsequent to the process shown in FIG. 8D.
Figure 9E:
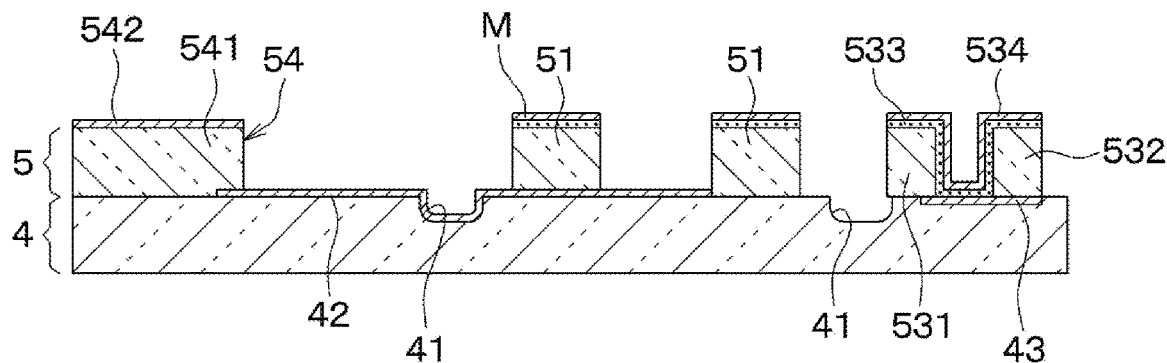
FIG. 9E is a diagram showing a cross-sectional view of a process subsequent to the process shown in FIG. 9D.

Next, for example, by trench etching such as DRIE, as shown in FIGS. 8E and 9E, unnecessary portions of the upper substrate 5 are removed to partly expose the lower substrate 4, so that the inner frame portion 51 and the first base portion 531 of the first electrode portion 53 are separated from each other. In this way, the mounting substrate 3 having the groove 41, the wiring 42, the first electrode portion 53 and the second electrode portion 54 is produced.

Subsequently, for example, the mounting substrate 3 is suctioned to and fixed to a mounter device (not shown), and the bonding member 52 is arranged in a region of the mounting substrate 3 surrounded by the inner frame portion 51. Then, the micro vibrator 2 is transported by a transporting device (not shown) so that the mounting surface 22b of the connecting portion 22 is brought into contact with the bonding member 52. The bonding member 52 is then solidified. Thus, the micro vibrator 2 is mounted on the mounting substrate 3. For example, the micro vibrator 2 can be transported by bringing a holding mechanism of the transporting device (not shown), which is capable of vacuum adsorption, into contact with the suction surface 22a of the micro vibrator 2 and holding the micro vibrator 2 by vacuum adsorption. Also, the mounting substrate 3 is heated by a heating mechanism (not shown) of the mounter device, and the micro vibrator 2 is placed on the mounting substrate 3 and is then cooled to solidify the bonding member 52. In this way, the micro vibrator 2 is bonded to the mounting substrate 3.

The alignment of the micro vibrator 2 with respect to the mounting substrate 3 may be performed in such a manner that the micro vibrator 2 and the mounting substrate 3 are imaged, feature points are extracted by edge detection using a known image processing technique, and the relative positions are adjusted.

Figure 8F:
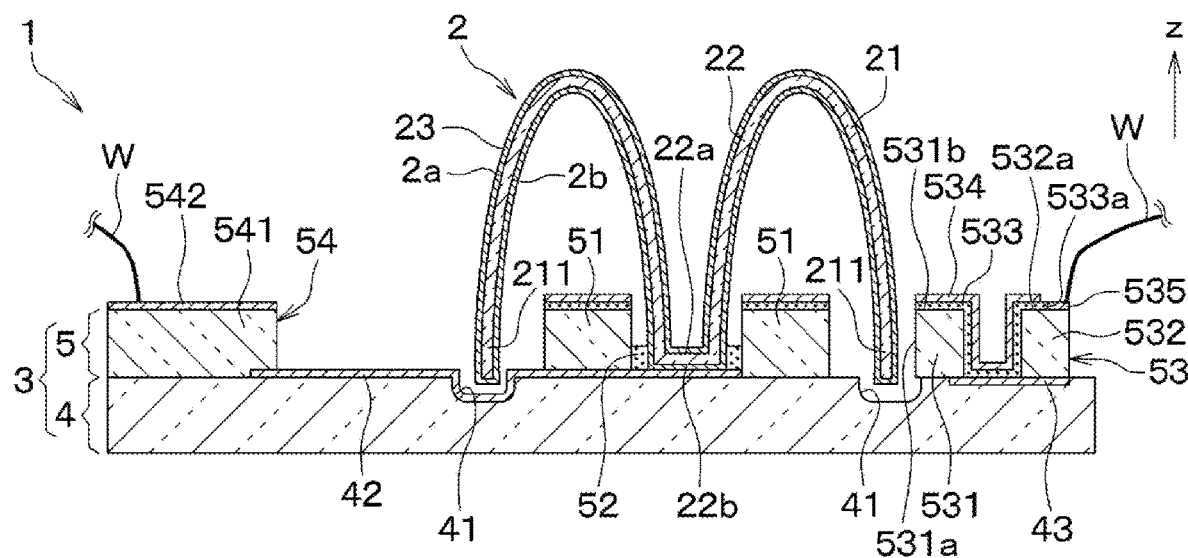
FIG. 8F is a diagram showing a cross-sectional view of a process subsequent to the process shown in FIG. 8E.
Figure 9F:
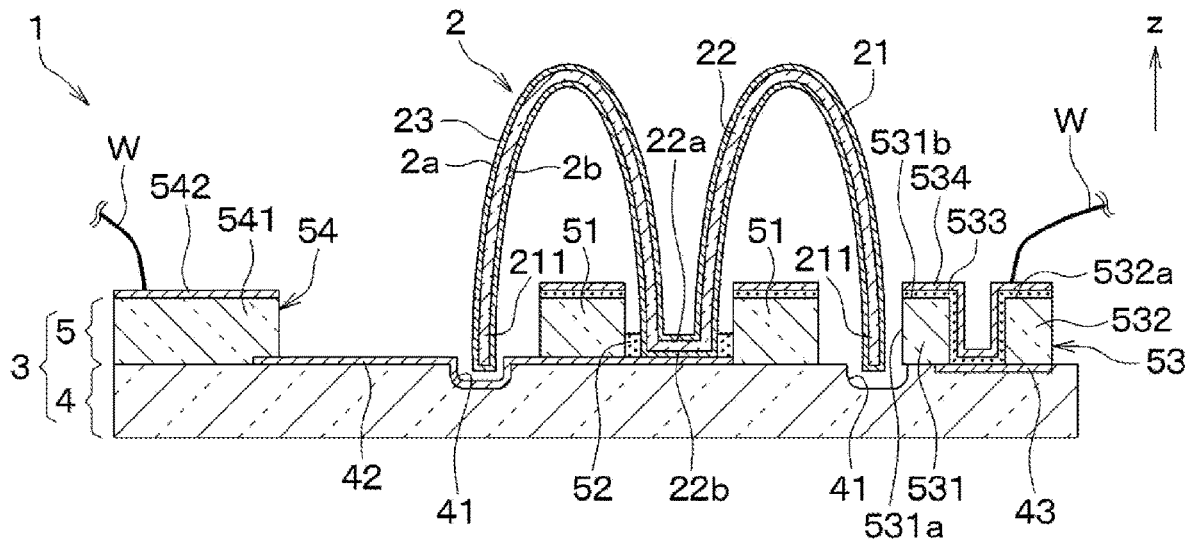
FIG. 9F is a diagram showing a cross-sectional view of a process subsequent to the process shown in FIG. 9E.

Thereafter, for example, as shown in FIGS. 8F and 9F, wires W are connected to the guard electrode 534, the lead-out electrode 535 and the electrode par 542, respectively, by wire bonding.

Through the processes described above, an inertial sensor having the mounting structure 1 of the present embodiment can be manufactured.

In the mounting structure 1 of the present embodiment, the upper surface 531b of the first base portion 531 of the first electrode portion 53 facing the rim 211 of the micro vibrator 2 is covered with the guard electrode 534. Therefore, the lines of electric force from the upper surface 531b toward the upper side surface of the rim 211 can be shielded. As a result, the noise resulting from the surfaces of the multiple first electrode portions 53 other than the facing surfaces 531*a* facing the micro vibrator 2 can be suppressed in the mounting structure 1, and hence the accuracy to detect capacitance improves.

Second Embodiment

A mounting structure 1 according to a second embodiment will be described with reference to the drawings.

Figure 10:
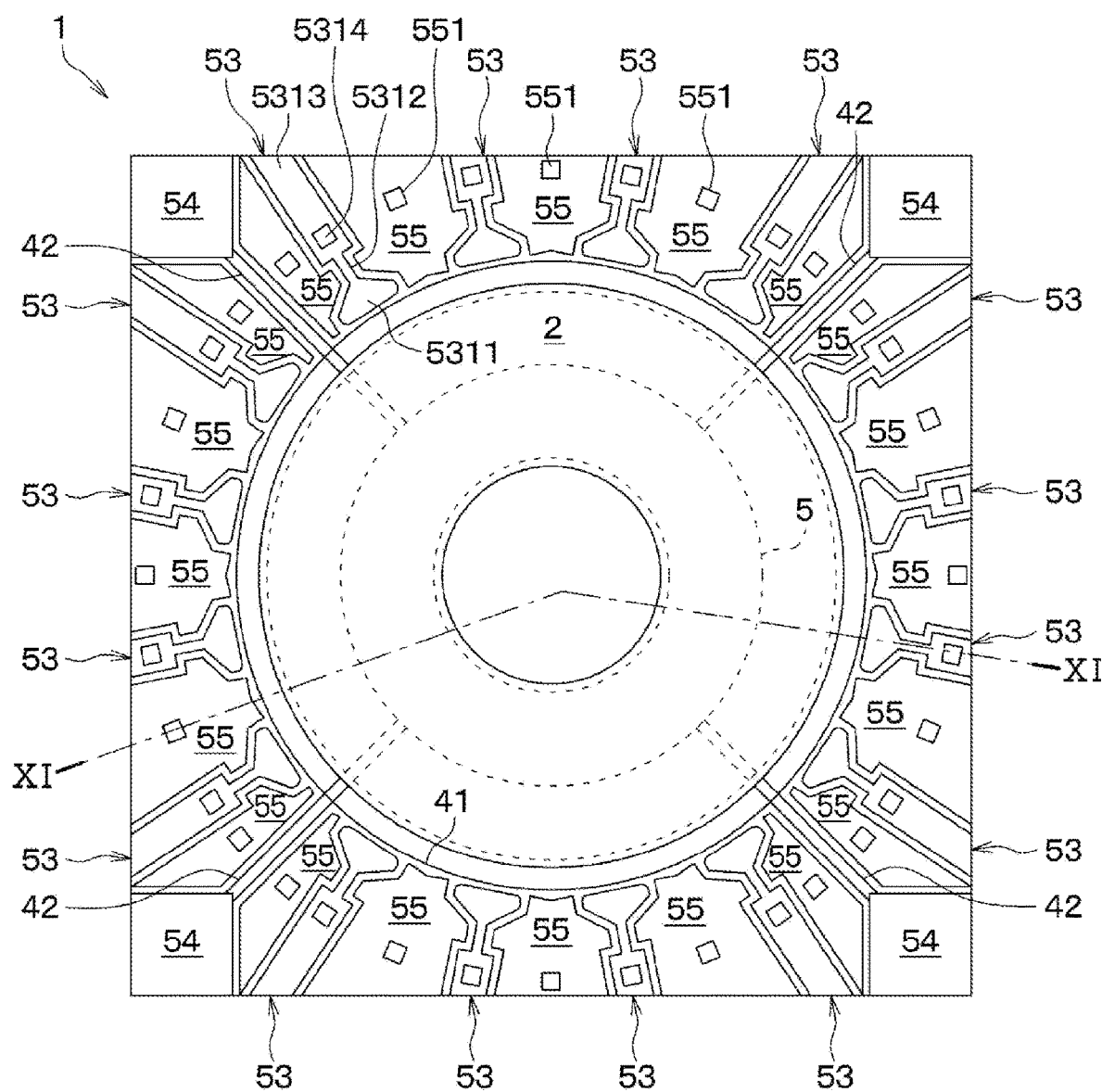
FIG. 10 is diagram showing a top layout view of an inertial sensor according to a second embodiment.

In FIG. 10, the dashed lines indicate portions of the outlines of a micro vibrator 2 and a mounting substrate 3 that cannot be visually recognized in a top view. This also applies to FIGS. 13 and 14, which will be described later.

In the mounting structure 1 of the present embodiment, for example, as shown in FIG. 10, the mounting substrate 3 has at least one guard electrode 55 between adjacent first electrode portions 53. Further, the multiple first electrode portions 53 each have a portion facing the rim 211 and whose width increases toward the rim 211, in a top view of the mounting substrate 3. The mounting structure 1 of the present embodiment differs from the first embodiment in this point. Hereinafter, the difference from the first embodiment will be mainly described.

In the present embodiment, each of the multiple first electrode portions 53 has only the first base portion 531 as the base portion and does not have the second base portion 532. The first electrode portion 53 includes a facing portion 5311 facing the rim 211, a narrow-width portion 5312 connecting to the facing portion 5311, and a terminal portion 5313 connecting to the narrow-width portion 5312 opposite to the facing portion 5311. In other words, in the present embodiment, the first base portion 531 is composed of the facing portion 5311, the narrow-width portion 5312 and the terminal portion 5313.

Figure 11:
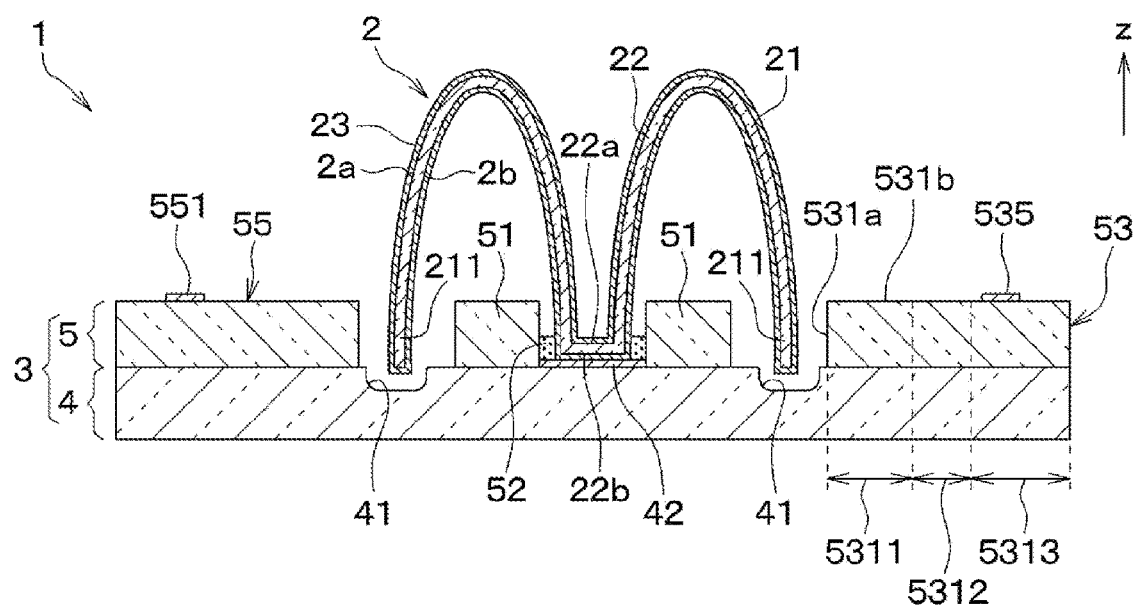
FIG. 11 is a cross-sectional view taken along a line XI-XI in FIG. 10.

The facing portion 5311 is a portion having a facing surface 531*a* that faces the rim 211, as shown in FIG. 11, for example. The facing portion 5311 has, for example, a substantially triangular shape when viewed from the top. Thus, the facing portion 5311 has a larger width at an end on the rim 211 side, and has a smallest width at an end on the narrow-width portion 5312. As a result, in the first electrode portion 53, the area of the upper surface 531*b* of the facing portion 5311 is smaller than that without having the narrow-width portion 5312. As such the influence of the line of electric force due to the upper surface 531*b* of the facing portion 5311 can be reduced.

The narrow-width portion 5312 connects between the facing portion 5311 and the terminal portion 5313 and is the narrowest portion in the first electrode portion 53 when viewed from the top.

The terminal portion 5313 is formed with a lead-out electrode 535, and a wire (not shown) is connected to an upper surface 531*b* of the lead-out electrode 535. Thus, the terminal portion 5313 provides a wire connection region.

The mounting substrate 3 has the multiple guard electrode 55. In the present embodiment, at least one guard electrode 55 is formed in an area between adjacent first electrode portions 53. For example, the multiple guard electrodes 55 and the first electrode portions 53 are alternately arranged. However, the arrangement will not be limited to this example. The multiple guard electrodes 55 are made of, for example, the same material as the first base portions 531 of the first electrode portions 53, and are separated from the electrode portions 53 and 54 by conducting the etching on the silicon substrate forming the upper substrate 5. The multiple guard electrodes 55 are spaced apart from the first electrode portions 53 and the second electrode portions 54, and are electrically independent of the first electrode portions 53 and the second electrode portions 54. For example, as shown in FIGS. 10 and 11, each of the multiple guard electrodes 55 has a terminal electrode 551, to which a wire (not shown) is connected, on the upper surface opposite to the mounting substrate 3.

The multiple guard electrodes 55 need to be not in contact with the multiple first electrode portions 53 and the second electrode portions 54. The shape, the number, and the arrangement of the multiple guard electrodes 55 can be changed as appropriate as long as the multiple guard electrodes 55 are not in contact with the multiple electrode portions 53 and the second electrode portion 54. In addition, the distance defined between the guard electrode 55 and the adjacent first electrode portion, when viewed from the top 53, may be adjusted as necessary. For example, the guard electrode 55 is arranged so that a first distance to the drive electrode among the first electrode portions 53, which drives the micro vibrator 2, is relatively larger than a second distance to a detection electrode among the first electrode portions 53, which detects the capacitance with the micro vibrator 2.

In the mounting structure 1 of the present embodiment, the area of the upper surface 531*b* of the portion of the first electrode portion 53 facing the rim 211 is smaller than that of the first electrode portion without having the narrow-width portion 5312. Therefore, the influence of the lines of electric force toward the upper side surface of the rim 211 can be reduced. Accordingly, in this mounting structure 1, the noise resulting from the surfaces of the first electrode portion 53 other than the facing surface 531*a* can be suppressed.

Modification of Second Embodiment

Figure 12:
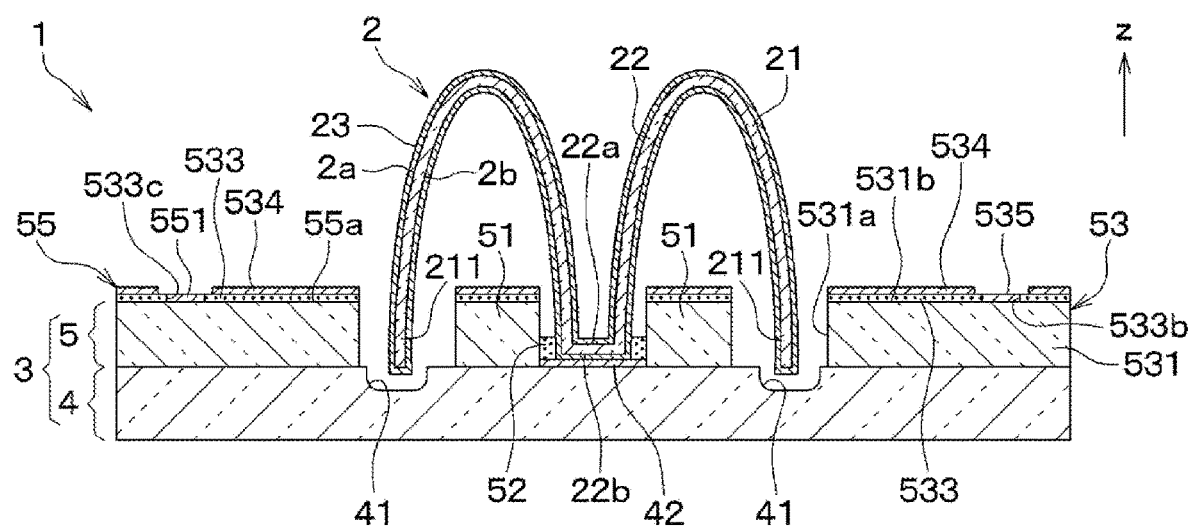
FIG. 12 is a diagram showing a cross-sectional view, corresponding to FIG. 11, of an inertial sensor according to a modification of the second embodiment.

The mounting structure 1 of the second embodiment may be modified as shown in FIG. 12. For example, each of the first electrode portion 53 and the guard electrode 55 may have a stacked configuration having the insulating film 533 and the guard electrode 534 on its upper surface 531*b*, 55*a*. In this case, the guard electrode 55 functions as a first guard electrode, and the guard electrode 534 formed on each of the first electrode portions 53 functions as second guard electrode. Further, a first contact hole 533*b* is formed in a portion of the insulating film 533 that is formed on the upper surface 531*b* of the first electrode portion 53, and a lead-out electrode 535 is formed inside the first contact hole 533*b*. A second contact hole 533*c* is formed in a portion of the insulating film 533 that covers the upper surface 55*a* of the guard electrode 55, and a terminal electrode 551 is formed inside the second contact hole 533*c*.

Some of the multiple guard electrodes 55 may be used as the drive electrodes for driving the micro vibrator 2 or as the detection electrodes for detecting the electrostatic capacitance. In this case, of the multiple guard electrodes 55, the guard electrode 55 that is used as the detection electrode for the electrostatic capacitance preferably has a configuration so that the portion facing the rim 211 has a large width at an end adjacent to the rim 211 and smaller width as a function of distance from the rim 211, similar to the facing portion 5311. In this case, the first electrode portion 53 that is adjacent to the first guard electrode 55 used as the detection electrode, and the second guard electrode 534 provided on the upper surface 531*b* of this first electrode portion 53 suppress the fringe effect, thereby achieving the noise reduction effect.

The second guard electrode 534 may be electrically or structurally connected to a part of or all of the other second guard electrodes 534 that are disposed above the other first electrode portions 53 or the first guard electrodes 55.

Also, the second guard electrodes 534 may be used as the drive electrodes, in place of the first base portions 531 of the first electrode portions 53. In this case, an electrostatic attractive force is generated to pull the portion of the rim 211 located below the second guard electrode 534 in the z-direction obliquely upward toward the second guard electrode 534, so the drive vibration mode of the micro vibrator 2 can be changed. In this case, for example, the first base portion 531 of the first electrode portion 53 is used as the detection electrode.

Also in this modification, the mounting structure 1 can achieve the similar effects to those of the second embodiment as described above. In this modification, since the upper surface 531*b* of the first electrode portion 53 is covered with the second guard electrode 534, the second guard electrode 534 shields the lines of electric force from the upper surface 531*b* toward the upper side surface of the rim 211. As such, the noise resulting from the surfaces other than the facing surface 531*a* can be further suppressed.

Other Embodiments

Although the present disclosure has been described in accordance with the embodiments, it is understood that the present disclosure is not limited to such embodiments and structures. The present disclosure encompasses various modifications and variations within the scope of equivalents. In addition, various combinations and modes, and other combinations and modes including only one element, more elements, or less elements are also within the scope and idea of the present disclosure.

(1) In each of the embodiments and modification described above, the mounting substrate 3 exemplarily has the groove 41 to restrict contact with the rim 211 of the micro vibrator 2. However, the present disclosure is not limited to such an example. For example, in a case where the rim 211 of the micro vibrator 2 is positioned higher in the z-direction than the mounting surface 22*b*, that is, in a case where the mounting surface 22*b* protrudes more than the rim 211 toward the mounting substrate 3, the mounting substrate 3 may not have the groove 41.

Figure 13:
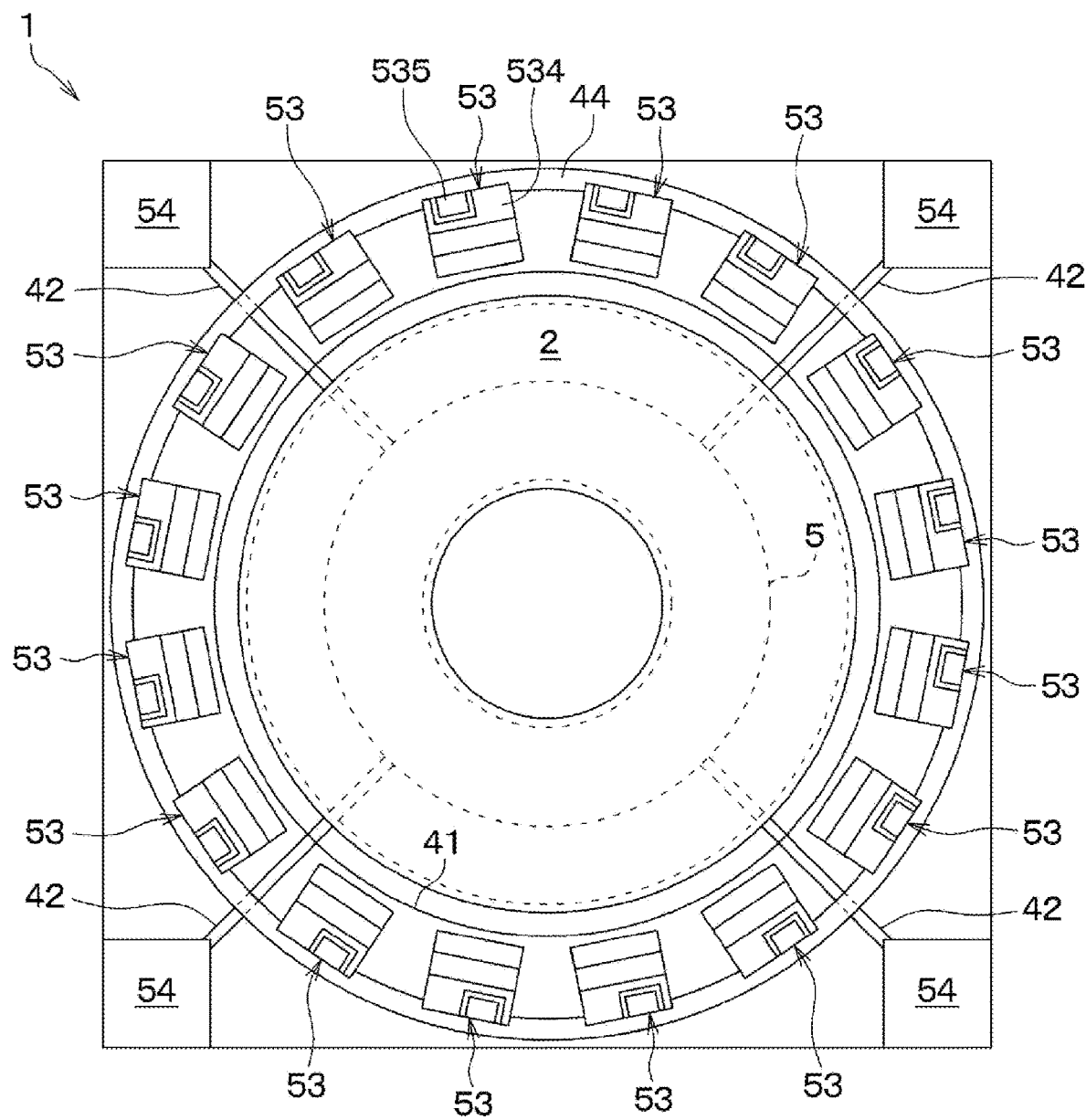
FIG. 13 is a diagram showing a top layout view of an example of an inertial sensor according to another embodiment.
Figure 14:
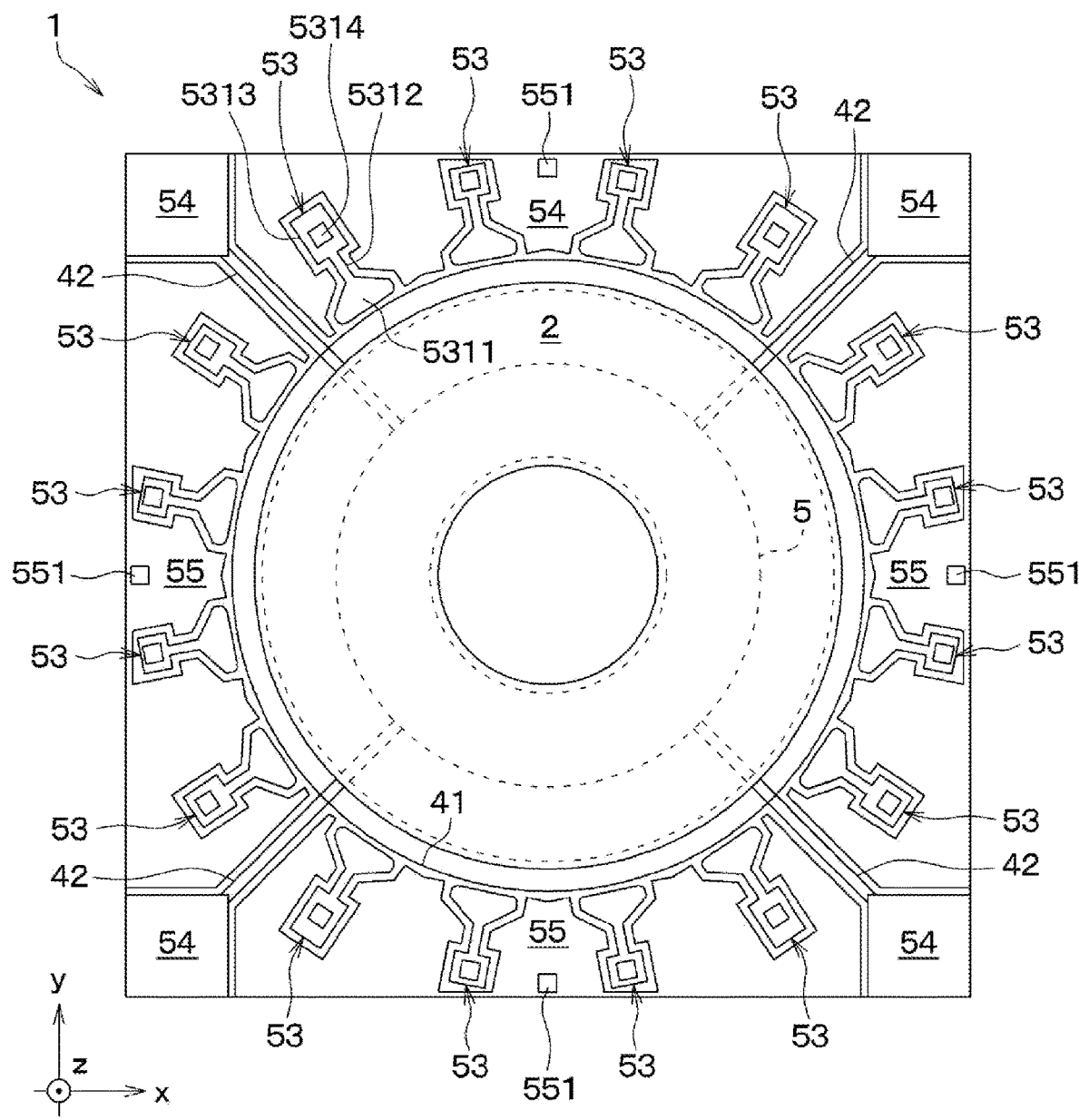
FIG. 14 is a diagram showing a top layout view of an example of an inertial sensor according to a further another embodiment.

(2) In the first embodiment described above, the guard electrode 534 covering the upper surface 531*b* of the first electrode portion 53 may be electrically connected to a part of or all of the guard electrodes 534 of the other first electrode portions 53. In this case, for example, as shown in FIG. 13, the mounting substrate 3 has a substantially ring-shaped peripheral wiring 44 on the outer peripheral side of the multiple first electrode portions 53 to connect the multiple guard electrodes 534. The peripheral wiring 44 is formed in the same process as the multiple guard electrodes 534, as well as using the same conductive material as the multiple guard electrodes 534, for example. Thus, the peripheral wiring 44 is integrated with the multiple guard electrodes 534. An insulating film (not shown), which is for example integrally formed with the insulating film 533, is formed directly under the peripheral wiring 44, and thus the peripheral wiring 44 is electrically independent of the other wirings such as the bridge wiring 42 and the like. As shown in FIG. 13, the peripheral wiring 44 may be formed so as to extend over the bridge wiring 42, or may be formed in a region other than the multiple bridge wirings 42 so as to connect some of the guard electrodes 534 of the multiple first electrode portions 53. Such arrangements may be changed as appropriate.

Further, the guard electrodes 534 may be formed into the ring shape together with the insulating film 533, in the top view, to be integrated with each other among the multiple first electrode portions 53 without requiring the outer peripheral wiring 44. In other words, the multiple first electrode portions 53 may be covered with a single common guard electrode 534.

(3) In the second embodiment described above, for example, as shown in FIG. 14, the multiple guard electrodes 55 may be connected to each other in a region outside the multiple first electrode portions 53. In this case, at least one terminal electrode 551 is formed for each guard electrode 55, and the number, arrangement, or the like thereof may be changed as appropriate. The area of the terminal portion 5313 of each first electrode portion 53 is reduced, for example, in order to secure the connection region for the plurality of guard electrodes 55.

Figure 15:
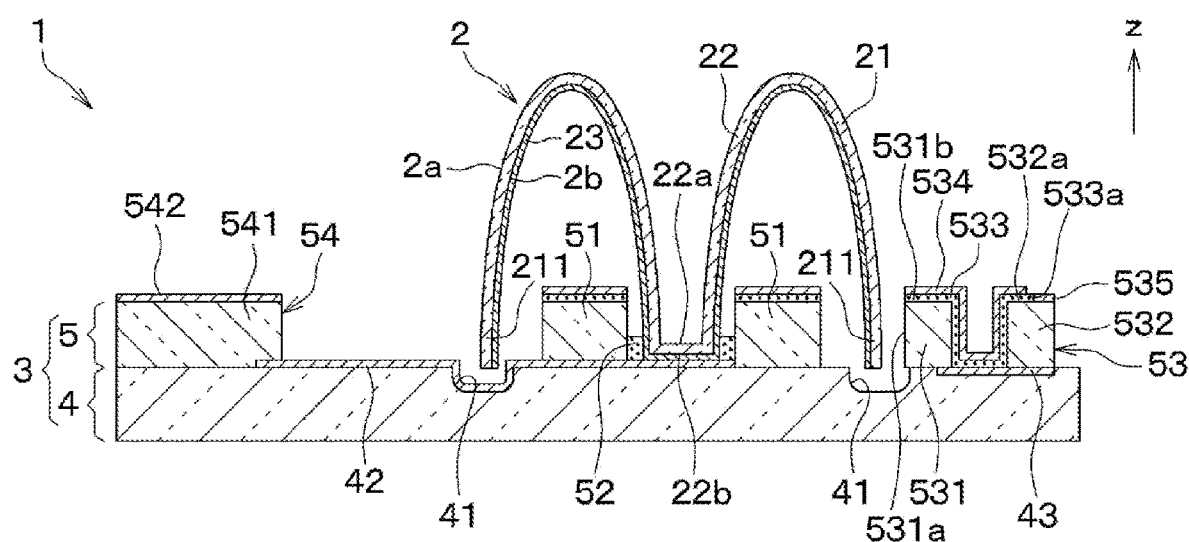
FIG. 15 is a diagram showing a cross-sectional view, corresponding to FIG. 3, of an example of an inertial sensor according to a still another embodiment.

(4) In the first embodiment described above, the micro vibrator 2 may have the surface electrode 23 only on the back surface 2*b* side, as shown in FIG. 15, for example. This may also apply to the second embodiment and its modification. In this case, the front surface 2*a* of the micro vibrator 2 is exposed to the outside, and the area covered with the surface electrode 23 is reduced, thereby obtaining the effect of improving the Q factor.

Figure 16:
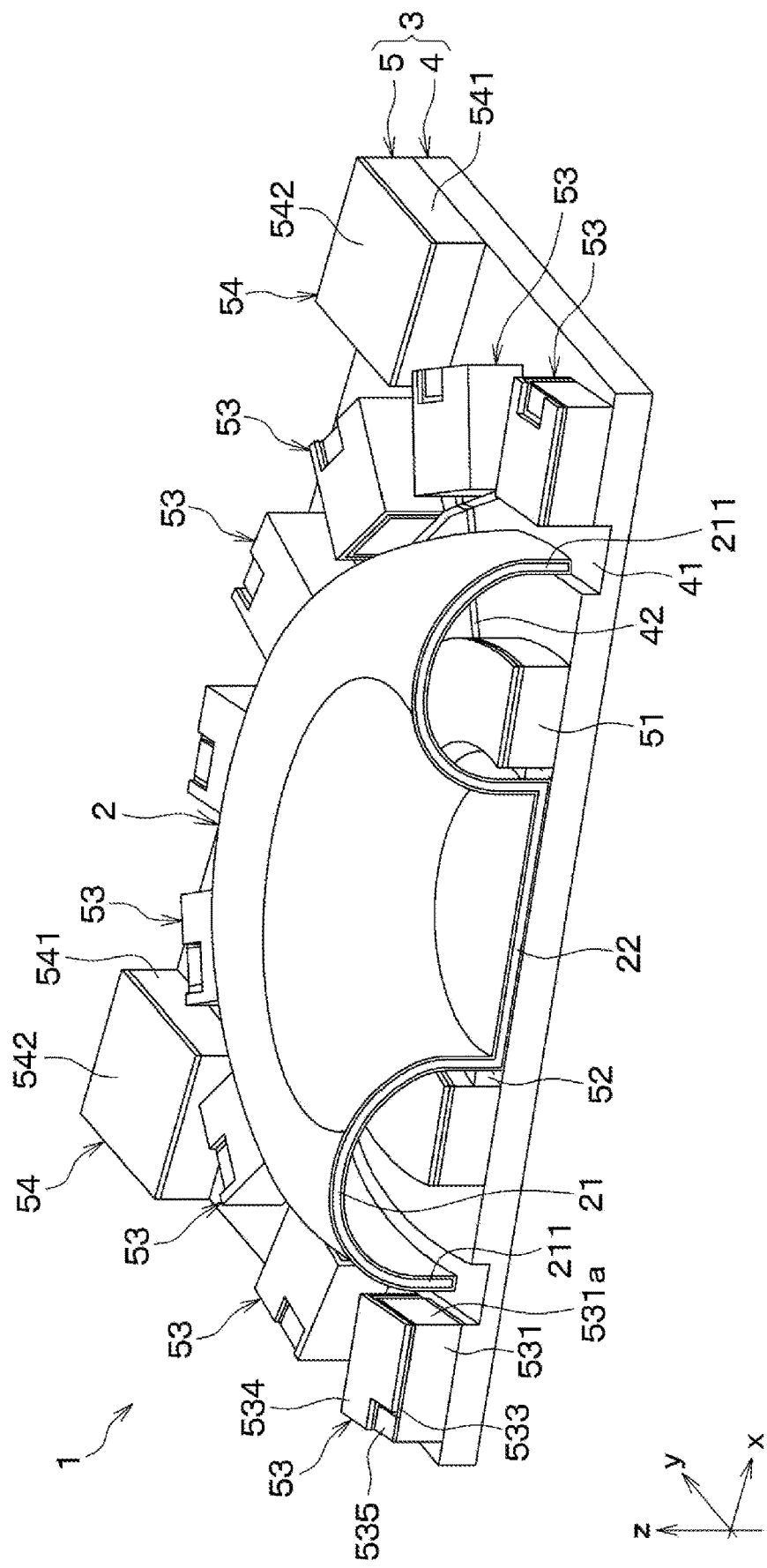
FIG. 16 is a diagram showing a cross-sectional view, corresponding to FIG. 2, of an example of an inertial sensor according to a yet another embodiment.

(5) In the first embodiment described above, the multiple first electrode portions 53 each may not have the second base portion 532. In this case, the first electrode portion 53 may have the insulating film 533 and the guard electrode 534 on the first base portion 531, as shown in FIG. 16, for example. In this case, the first electrode portion 53 is provided with the lead-out electrode 535 at a position exposing from the insulating film 533 on the upper surface 531*b*.

(6) In each of the embodiments and modifications described above, when a cover member, which will be also called a lid, is attached to the mounting structure 1, an electrode for controlling the driving vibration mode of the micro vibrator 2 may be additionally provided inside the cover member. In this case, it is possible to reduce the noise caused by the first electrode portion 53 on the mounting substrate 3 and to control the driving vibration mode of the micro vibrator 2 to a desired mode.

(7) In each of the embodiments and modifications described above, the mounting substrate 3 exemplarily has sixteen first electrode portions 53. However, the number of the first electrode portions 53 may not be limited. For example, the mounting substrate 3 may have a plurality of first electrode portions 53, preferably four or more first electrode portions 53, and the number of the first electrode portions 53 may be appropriately changed according to the outer diameter of the micro vibrator 2. For example, when the mounting substrate 3 has four first electrode portions 53, two of them are used as detection electrodes and the remaining two are used as drive electrodes.

(8) In each of the embodiments and modifications described above, the mounting substrate has at least one second electrode portion 54. The number, the arrangement, the shape, and the like of the second electrode portion 54 may be changed as appropriate as long as the second electrode portion 54 is electrically independent of the multiple first electrode portions 53. For example, the second electrode portion 54 may have a single frame shape surrounding the multiple first electrode portions 53 or may have a frame shape composed of a plurality of divided members.

(9) In the first embodiment described above, the upper surface of the inner frame portion 51 on the mounting substrate 3 is covered with the insulating film 533 and the metal film made of the same material as the guard electrode 534. Alternatively, the inner frame portion 51 may not be provided with the insulating film 533 and the metal film.

(10) The mounting structure 1 of each of the embodiments and modifications described above can control the drive mode such that the micro vibrator 2 is scalar driven by applying the same drive signal to all of the guard electrodes 534 or the guard electrodes 55. Note that the scalar drive is also called "parametric excitation" or "self-excited vibration."

(11) The constituent element(s) of each of the embodiment(s) described above is/are not necessarily essential unless it is specifically stated that the constituent element(s) is/are essential in the embodiment(s), or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Further, in each of the embodiments described above, when the shape of an element or the positional relationship between elements is mentioned, the present disclosure is not limited to the specific shape or positional relationship unless otherwise particularly specified or unless the present disclosure is limited to the specific shape or positional relationship in principle.

What is claimed is:

1. A mounting structure comprising:
    a micro vibrator that includes a curved surface portion having an annular curved surface and a connecting portion extending from the curved surface portion toward an inner center position of the curved surface portion; and
    a mounting substrate that includes a plurality of electrode portions arranged to face and surround a rim of the curved surface portion of the micro vibrator, the plurality of electrode portions being spaced apart from each other around an outer perimeter of the rim, the rim being an end of the curved surface portion disposed on an outer periphery of the connecting portion, wherein
    the micro vibrator is bonded to the mounting substrate at the connecting portion so that the curved surface portion is separated from and spaced apart from the mounting substrate so as to define a space therein,
    the plurality of electrode portions each include
        a base portion having a facing surface facing the rim on a radial exterior of the rim, and an upper surface different from the facing surface and facing away from a bottom portion of the base portion which is disposed on a base of the mounting substrate,
        an insulating film covering at least the upper surface of the base portion, and
        a guard electrode covering at least the upper surface of the base portion above the insulating film and being electrically independent of the base portion.

2. The mounting structure according to claim 1, wherein the plurality of electrode portions each include the base portion as a first base portion disposed outside of the rim, and a second base portion disposed further outside of the first base portion,
    the second base portion is electrically connected to the first base portion via a conductive layer,
    the insulating film is disposed to cover a surface of the second base portion on a side opposite to the mounting substrate,
    the guard electrode is disposed on the insulating film covering the surface of the second base portion, and
    the guard electrode is electrically independent of the second base portion.

3. The mounting structure according to claim 2, wherein the second base portion is made of a same material as the first base portion.

4. The mounting structure according to claim 3, wherein the insulating film is formed with a contact hole that allows a part of the surface of the second base portion to expose from the insulating film,
    the second base portion is provided with a lead-out electrode that is disposed inside the contact hole and covers the part of the surface of the second base portion exposed from the insulating film, and
    the lead-out electrode is electrically independent of the guard electrode.

5. The mounting structure according to claim 4, wherein the lead-out electrode is adapted to be electrically connectable with an external device.

6. The mounting structure according to claim 1, wherein the micro vibrator includes a surface electrode covering both the rim and a mounting surface of the connecting portion facing the mounting substrate,
    the mounting substrate includes a wiring that is electrically independent of the plurality of electrode portions, and
    the surface electrode is electrically connected to the wiring.

7. The mounting structure according to claim 6, wherein the surface electrode is formed of at least one film.

8. The mounting structure according to claim 1, wherein the mounting substrate includes an upper substrate and a lower substrate.

9. The mounting structure according to claim 1, wherein the mounting substrate includes an upper substrate made of a semiconductor material and a lower substrate made of an insulating material, the upper substrate and the lower substrate are anodically bonded together.

10. The mounting structure according to claim 1, further comprising
    an annular groove provided in the mounting substrate and disposed so as to correspond to the rim and to avoid direct contact of the rim with the mounting substrate.

11. The mounting structure according to claim 1, wherein the micro vibrator is bonded to the mounting substrate by a bonding member which is formed of a conductive material.

12. The mounting structure according to claim 1, wherein at least the facing surface of the base portion is exposed from the insulating film and the guard electrode.

13. The mounting structure according to claim 1, wherein the plurality of electrode portions that are arranged so as to be spaced apart from the outer perimeter of the rim and to be spaced apart from each other so as to surround the outer perimeter of the rim.

\* \* \* \* \*